(12) United States Patent
Zhai

(10) Patent No.: US 10,089,450 B2
(45) Date of Patent: Oct. 2, 2018

(54) USER AUTHENTICATION METHOD, AUTHENTICATION APPARATUS, AND TERMINAL

(71) Applicant: Huawei Technologies Co., Ltd., Shenzhen (CN)

(72) Inventor: Zhengde Zhai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 14/885,381

(22) Filed: Oct. 16, 2015

(65) Prior Publication Data

US 2016/0042163 A1 Feb. 11, 2016

Related U.S. Application Data

(63) Continuation of application No. PCT/CN2014/093910, filed on Dec. 16, 2014.

(30) Foreign Application Priority Data

Apr. 17, 2014 (CN) .......................... 2014 1 0153707

(51) Int. Cl.
  *H04L 29/00* (2006.01)
  *G06F 21/31* (2013.01)
  *H04L 9/32* (2006.01)

(52) U.S. Cl.
  CPC ............. *G06F 21/316* (2013.01); *H04L 9/32* (2013.01)

(58) Field of Classification Search
  CPC .................................. G06F 21/316; H04L 9/32
  (Continued)

(56) References Cited

U.S. PATENT DOCUMENTS

2008/0127311 A1* 5/2008 Yasaki .................... G06F 21/35
  726/4
2008/0155651 A1* 6/2008 Wasmund ............. G06F 21/316
  726/2

(Continued)

FOREIGN PATENT DOCUMENTS

| CN | 101110667 A | 1/2008 |
|---|---|---|
| CN | 102035649 A | 4/2011 |

(Continued)

OTHER PUBLICATIONS

Foreign Communication From a Counterpart Application, European Application No. 14886670.0, Extended European Search Report dated Apr. 4, 2016, 7 pages.

(Continued)

*Primary Examiner* — Anthony D Brown
*Assistant Examiner* — Michael D Anderson
(74) *Attorney, Agent, or Firm* — Conley Rose, P.C.

(57) ABSTRACT

A user authentication method and a terminal. The method includes determining first-type authentication information and second-type authentication information that are of a terminal, wherein the first-type authentication information includes specific attribute information that is in specific attribute information of an interaction object corresponding to a specific interaction behavior of the terminal and whose occurrence frequency within a preset time falls in a preset range, and wherein the second-type authentication information is used to interfere with selection, by the user of the terminal, of the first-type authentication information; presenting an authentication challenge set to the user of the terminal; receiving an identification result; and determining an authentication result. According to the user authentication method, authentication information is dynamically gener- (Continued)

ated using information about an interaction object to perform authentication on a user.

25 Claims, 5 Drawing Sheets

(58) Field of Classification Search
USPC .............................................................. 726/3
See application file for complete search history.

(56) References Cited

U.S. PATENT DOCUMENTS

| | | | |
|---|---|---|---|
| 2009/0133106 A1 | 5/2009 | Bentley et al. | |
| 2009/0133117 A1 | 5/2009 | Bentley et al. | |
| 2011/0283241 A1 | 11/2011 | Miller et al. | |
| 2012/0054177 A1 | 3/2012 | Wang et al. | |
| 2012/0079576 A1 | 3/2012 | Han et al. | |
| 2012/0214442 A1 | 8/2012 | Crawford et al. | |
| 2013/0036461 A1 | 2/2013 | Lowry | |
| 2013/0091559 A1 | 4/2013 | Thun | |
| 2014/0259130 A1* | 9/2014 | Li | G06F 21/31 726/6 |

FOREIGN PATENT DOCUMENTS

| | | |
|---|---|---|
| CN | 102487415 A | 6/2012 |
| CN | 102520857 A | 6/2012 |
| CN | 103455965 A | 12/2013 |
| CN | 103516518 A | 1/2014 |
| CN | 103701757 A | 4/2014 |
| EP | 1658593 B1 | 12/2008 |
| EP | 2565765 A1 | 3/2013 |
| EP | 2414982 B1 | 1/2015 |
| JP | 2008059182 A | 3/2008 |
| JP | 2013020385 A | 1/2013 |
| JP | 2013242661 A | 12/2013 |

OTHER PUBLICATIONS

Partial English Translation and Abstract of Chinese Patent Application No. CN102487415, dated Jan. 14, 2016, 4 pages.
Partial English Translation and Abstract of Chinese Patent Application No. CN102520857, dated Jan. 14, 2016, 4 pages.
Foreign Communication From a Counterpart Application, PCT Application No. PCT/CN2014/093910, English Translation of International Search Report dated Mar. 27, 2015, 2 pages.
Foreign Communication From a Counterpart Application, PCT Application No. PCT/CN2014/093910, Written Opinion dated Mar. 27, 2015, 5 pages.
Partial English Translation and Abstract of Japanese Patent Application No. JPA200859182, dated Feb. 8, 2017, 27 pages.
Partial English Translation and Abstract of Japanese Patent Application No. JP201320385, dated Feb. 8, 2017, 25 pages.
Partial English Translation and Abstract of Japanese Patent Application No. JP2013242661, dated Feb. 8, 2017, 11 pages.
Foreign Communication From a Counterpart Application, Japanese Application No. 2016/528350, Japanese Office Action dated Nov. 29, 2016, 6 pages.
Foreign Communication From a Counterpart Application, Japanese Application No. 2016/528350, English Translation of Japanese Office Action dated Nov. 29, 2016, 7 pages.
Machine Translation and Abstract of Chinese Publication No. CN103516518, dated Jan. 15, 2014, 15 pages.
Machine Translation and Abstract of Chinese Publication No. CN103701757, dated Apr. 2, 2014, 22 pages.
Foreign Communication From a Counterpart Application, Chinese Application No. 201410153707.6, Chinese Search Report dated Oct. 25, 2017, 2 pages.
Foreign Communication From a Counterpart Application, Chinese Application No. 201410153707.6, Chinese Office Action dated Nov. 6, 2017, 6 pages.

* cited by examiner

USER AUTHENTICATION METHOD, AUTHENTICATION APPARATUS, AND TERMINAL

CROSS-REFERENCE TO RELATED APPLICATIONS

This application is a continuation of International Application No. PCT/CN2014/093910, filed on Dec. 16, 2014, which claims priority to Chinese Patent Application No. 201410153707.6, filed on Apr. 17, 2014, both of which are hereby incorporated by reference in their entireties.

TECHNICAL FIELD

Embodiments of the present invention relate to the terminal field, and in particular, to a user authentication method, an authentication apparatus, and a terminal.

BACKGROUND

A user equipment or an application program needs to frequently authenticate a user, so as to determine an identity of the current user. Authentication is a primary security barrier before the user is allowed to access data and an application in a terminal.

One of the most essential factors of a user authentication mechanism is a possibly low user memory price, which improves usability. In addition, the user equipment is always carried along by the user and used in various occasions and circumstances, and an authentication process is easily peeped at. Therefore, it is required that the authentication mechanism has a certain anti-peeping capability.

SUMMARY

Embodiments of the present invention provide a user authentication method, an authentication apparatus, and a terminal, which can reduce a memory price of a user and has a certain anti-peeping capability at the same time.

According to a first aspect, a user authentication method is provided, and the method includes determining first-type authentication information and second-type authentication information that are of a terminal, where the first-type authentication information includes specific attribute information that is in specific attribute information of an interaction object corresponding to a specific interaction behavior of the terminal and whose occurrence frequency within a preset time falls in a preset range, the specific attribute information is one type of attribute information of the interaction object or a combination of multiple types of attribute information of the interaction object, and the second-type authentication information is used to interfere with selection, by a user of the terminal, of the first-type authentication information; presenting a first authentication challenge set to the user of the terminal, where the first authentication challenge set includes at least one piece of the first-type authentication information and at least one piece of the second-type authentication information; receiving an identification result obtained by identifying, by the user of the terminal, the first-type authentication information and the second-type authentication information that are in the first authentication challenge set; and determining an authentication result according to an identification correctness rate of the first-type authentication information in the identification result.

With reference to the first aspect, in a first possible implementation manner, specific implementation is as follows. The second-type authentication information includes at least one of the following: specific attribute information that is in the specific attribute information of the interaction object corresponding to the specific interaction behavior of the terminal and whose occurrence frequency within the preset time falls outside the preset range; and specific attribute information that does not belong to the specific attribute information of the interaction object corresponding to the specific interaction behavior of the terminal.

With reference to the first aspect or the first possible implementation manner of the first aspect, in a second possible implementation manner, specific implementation is as follows. The first-type authentication information further includes specific attribute information of an interaction object specified in the terminal by the user of the terminal, so as to reduce a memory price of memorizing the first-type authentication information by the user of the terminal.

With reference to the first aspect or the first possible implementation manner of the first aspect or the second possible implementation manner of the first aspect, in a third possible implementation manner, before the receiving an identification result obtained by identifying, by the user of the terminal, the first-type authentication information and the second-type authentication information that are in the first authentication challenge set, the method further includes, if the interaction object corresponding to the specific interaction behavior of the terminal changes, or the terminal generates a new specific interaction behavior, redetermining the first-type authentication information and the second-type authentication information that are of the terminal, and presenting a second authentication challenge set to the user of the terminal, where the second authentication challenge set is generated based on the redetermined first-type authentication information and second-type authentication information.

With reference to the third possible implementation manner of the first aspect, in a fourth possible implementation manner, specific implementation is as follows. That the interaction object corresponding to the specific interaction behavior of the terminal changes includes: the interaction object corresponding to the specific interaction behavior of the terminal is added, or the interaction object corresponding to the specific interaction behavior of the terminal is deleted, or the interaction object corresponding to the specific interaction behavior of the terminal is modified.

With reference to the first aspect or any possible implementation manner of the first possible implementation manner of the first aspect to the fourth possible implementation manner of the first aspect, in a fifth possible implementation manner, specific implementation is as follows. The specific interaction behavior of the terminal includes a behavior that the terminal accesses a contact in the terminal, and the first-type authentication information and the second-type authentication information are specific attribute information of the contact; or the specific interaction behavior of the terminal includes a behavior that the terminal accesses an audio and video file in the terminal, and the first-type authentication information and the second-type authentication information are specific attribute information of the audio and video file; or the specific interaction behavior of the terminal includes a behavior that the terminal accesses an application in the terminal, and the first-type authentication information and the second-type authentication information are specific attribute information of the application; or the specific interaction behavior of the terminal includes a behavior that the terminal accesses a website, and the first-type authentication information and the second-type authentication information are specific attribute information of the website; or the specific interaction behavior of the terminal includes a behavior that the terminal accesses a picture in the terminal, and the first-type authentication information and the second-type authentication information are specific attribute information of the picture; or the specific interaction behavior of the terminal includes a behavior that the terminal accesses an ebook in the terminal, and the first-type authentication information and the second-type authentication information are specific attribute information of the ebook; or the specific interaction behavior of the terminal includes a behavior that the terminal communicates with a device outside the terminal, and the first-type authentication information and the second-type authentication information are information about a geographical area in which the terminal is located when the terminal communicates with the device outside the terminal.

With reference to the first aspect or any possible implementation manner of the first possible implementation manner of the first aspect to the fifth possible implementation manner of the first aspect, in a sixth possible implementation manner, before the determining first-type authentication information and at least one piece of second-type authentication information that are of a terminal, the method further includes configuring the preset time, the preset range, and a quantity N of pieces of the first-type authentication information that needs to be identified for performing authentication on the user of the terminal. Specific implementation of the determining an authentication result according to an identification correctness rate of the first-type authentication information in the identification result is as follows: determining, when the quantity of pieces of the first-type authentication information that is identified by the user of the terminal and is in the identification result is not less than N, that the authentication on the user of the terminal succeeds; or determining, when the quantity of pieces of the first-type authentication information that is identified by the user of the terminal and is in the identification result is less than N, that the authentication on the user of the terminal fails.

With reference to the sixth possible implementation manner of the first aspect, in a seventh possible implementation manner, when the preset time is longer and the preset range is larger, a set of the first-type authentication information is larger, and security strength of the authentication on the user of the terminal is higher; when the quantity N of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

With reference to the first aspect or any possible implementation manner of the first possible implementation manner of the first aspect to the seventh possible implementation manner of the first aspect, in an eighth possible implementation manner, specific implementation is as follows. The preset range is a range in which a quantity of occurrence times of the specific attribute information of the interaction object corresponding to the specific interaction behavior of the terminal within the preset time exceeds a preset quantity of times, or a range in which a quantity of occurrence times of the specific attribute information of the interaction object corresponding to the specific interaction behavior of the terminal within the preset time exceeds a preset percentage of a total quantity of occurrence times, or a range in which ranking of a quantity of occurrence times of the specific attribute information of the interaction object corresponding to the specific interaction behavior of the terminal within the preset time falls within preset ranking, or a range in which ranking of a quantity of occurrence times of the specific attribute information of the interaction object corresponding to the specific interaction behavior of the terminal within the preset time falls within a preset percentage.

With reference to the first aspect or any possible implementation manner of the first possible implementation manner of the first aspect to the eighth possible implementation manner of the first aspect, in a ninth possible implementation manner, before the determining first-type authentication information of a terminal, the method further includes configuring a set of excluded authentication information of the terminal, where authentication information in the set of excluded authentication information cannot be used as the first-type authentication information. In this case, specific implementation of the determining first-type authentication information of a terminal is as follows: determining that specific attribute information that is in the specific attribute information of the interaction object corresponding to the specific interaction behavior of the terminal, whose occurrence frequency within the preset time falls in the preset range, and that does not belong to the set of excluded authentication information is the first-type authentication information.

With reference to the first aspect or any possible implementation manner of the first possible implementation manner of the first aspect to the ninth possible implementation manner of the first aspect, in a tenth possible implementation manner, before the presenting a first authentication challenge set to the user of the terminal, the method further includes generating the first authentication challenge set according to the first-type authentication information and the second-type authentication information that are of the terminal, so as to present the first authentication challenge set to the user of the terminal.

With reference to the first aspect or any possible implementation manner of the first possible implementation manner of the first aspect to the tenth possible implementation manner of the first aspect, in an eleventh possible implementation manner, the terminal includes a smartphone, a tablet computer, a personal computer, a server, or a workstation.

According to a second aspect, an authentication apparatus is provided, and the apparatus includes a confirming unit configured to determine first-type authentication information and second-type authentication information that are of a terminal, where the first-type authentication information includes specific attribute information that is in specific attribute information of an interaction object corresponding to a specific interaction behavior of the terminal and whose occurrence frequency within a preset time falls in a preset range, the specific attribute information is one type of attribute information of the interaction object or a combination of multiple types of the attribute information of the interaction object, and the second-type authentication information is used to interfere with selection, by a user of the terminal, of the first-type authentication information; an authentication presenting unit configured to present a first authentication challenge set to the user of the terminal, where the first authentication challenge set includes at least one piece of the first-type authentication information and at least one piece of the second-type authentication information; a receiving unit configured to receive an identification result obtained by identifying, by the user of the terminal, the first-type authentication information and the second-type authentication information that are in the first authentication challenge set; and an authentication unit configured to determine an authentication result according to an identification correctness rate of the first-type authentication information in the identification result.

With reference to the second aspect, in a first possible implementation manner, specific implementation is as follows. The second-type authentication information includes at least one of the following: specific attribute information that is in the specific attribute information of the interaction object corresponding to the specific interaction behavior of the terminal and whose occurrence frequency within the preset time falls outside the preset range; and specific attribute information that does not belong to the specific attribute information of the interaction object corresponding to the specific interaction behavior of the terminal.

With reference to the second aspect or the first possible implementation manner of the second aspect, in a second possible implementation manner, specific implementation is as follows. The first-type authentication information further includes specific attribute information of an interaction object specified in the terminal by the user of the terminal, so as to reduce a memory price of memorizing the first-type authentication information by the user of the terminal.

With reference to the second aspect or the first possible implementation manner of the second aspect or the second possible implementation manner of the second aspect, in a third possible implementation manner, before the receiving unit receives the identification result obtained by identifying, by the user of the terminal, the first-type authentication information and the second-type authentication information that are in the first authentication challenge set, if the interaction object corresponding to the specific interaction behavior of the terminal changes, or the terminal generates a new specific interaction behavior, the confirming unit is further configured to redetermine the first-type authentication information and the second-type authentication information that are of the terminal, so that the authentication presenting unit presents a second authentication challenge set to the user of the terminal, where the second authentication challenge set is generated based on the first-type authentication information and the second-type authentication information that are redetermined by the determining unit.

With reference to the third possible implementation manner of the second aspect, in a fourth possible implementation manner, specific implementation is as follows. That the interaction object corresponding to the specific interaction behavior of the terminal changes includes: the interaction object corresponding to the specific interaction behavior of the terminal is added, or deleting the interaction object corresponding to the specific interaction behavior of the terminal, or modifying the interaction object corresponding to the specific interaction behavior of the terminal.

With reference to the second aspect or any possible implementation manner of the first possible implementation manner of the second aspect to the fourth possible implementation manner of the second aspect, in a fifth possible implementation manner, specific implementation is as follows. The specific interaction behavior of the terminal includes a behavior that the terminal accesses a contact in the terminal, and the first-type authentication information and the second-type authentication information are specific attribute information of the contact; or the specific interaction behavior of the terminal includes a behavior that the terminal accesses an audio and video file in the terminal, and the first-type authentication information and the second-type authentication information are specific attribute information of the audio and video file; or the specific interaction behavior of the terminal includes a behavior that the terminal accesses an application in the terminal, and the first-type authentication information and the second-type authentication information are specific attribute information of the application; or the specific interaction behavior of the terminal includes a behavior that the terminal accesses a website, and the first-type authentication information and the second-type authentication information are specific attribute information of the website; or the specific interaction behavior of the terminal includes a behavior that the terminal accesses a picture in the terminal, and the first-type authentication information and the second-type authentication information are specific attribute information of the picture; or the specific interaction behavior of the terminal includes a behavior that the terminal accesses an ebook in the terminal, and the first-type authentication information and the second-type authentication information are specific attribute information of the ebook; or the specific interaction behavior of the terminal includes a behavior that the terminal communicates with a device outside the terminal, and the first-type authentication information and the second-type authentication information are information about a geographical area in which the terminal is located when the terminal communicates with the device outside the terminal.

With reference to the second aspect or any possible implementation manner of the first possible implementation manner of the second aspect or the fifth possible implementation manner of the second aspect, in a sixth possible implementation manner, the apparatus further includes a first configuration unit, and the first configuration unit is configured to configure the preset time, the preset range, and a quantity N of pieces of the first-type authentication information that needs to be identified for performing authentication on the user of the terminal. The authentication unit is specifically configured to, when the quantity of pieces of the first-type authentication information that is identified by the user of the terminal and is in the identification result is not less than N, or when the quantity of pieces of the first-type authentication information that is identified by the user of the terminal and is in the identification result is less than N, determine that the authentication on the user of the terminal fails.

With reference to the sixth possible implementation manner of the second aspect, in a seventh possible implementation manner, when the preset time is longer and the preset range is larger, a set of the first-type authentication information is larger, and security strength of the authentication on the user of the terminal is higher; when the quantity of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

With reference to the second aspect or any possible implementation manner of the first possible implementation manner of the second aspect to the seventh possible implementation manner of the second aspect, in an eighth possible implementation manner, specific implementation is as follows. The preset range is a range in which a quantity of occurrence times of the specific attribute information of the interaction object corresponding to the specific interaction behavior of the terminal within the preset time exceeds a preset quantity of times, or a range in which a quantity of occurrence times of the specific attribute information of the interaction object corresponding to the specific interaction behavior of the terminal within the preset time exceeds a preset percentage of a total quantity of occurrence times, or a range in which ranking of a quantity of occurrence times of the specific attribute information of the interaction object corresponding to the specific interaction behavior of the terminal within the preset time falls within preset ranking, or a range in which ranking of a quantity of occurrence times of the specific attribute information of the interaction object corresponding to the specific interaction behavior of the terminal within the preset time falls within a preset percentage.

With reference to the second aspect or any possible implementation manner of the first possible implementation manner of the second aspect to the eighth possible implementation manner of the second aspect, in a ninth possible implementation manner, the apparatus further includes a second configuration unit, and the second configuration unit is configured to configure a set of excluded authentication information of the terminal, where authentication information in the set of excluded authentication information cannot be used as the first-type authentication information. In a process of determining the first-type authentication information of the terminal, the determining unit is specifically configured to determine that specific attribute information that is in the specific attribute information of the interaction object corresponding to the specific interaction behavior of the terminal, whose occurrence frequency within the preset time falls in the preset range, and that does not belong to the set of excluded authentication information is the first-type authentication information.

With reference to the second aspect or any possible implementation manner of the first possible implementation manner of the second aspect to the ninth possible implementation manner of the second aspect, in a tenth possible implementation manner, the apparatus further includes a generating unit, and the generating unit is configured to generate the first authentication challenge set according to the first-type authentication information and the second-type authentication information that are of the terminal, so as to present the first authentication challenge set to the user of the terminal.

With reference to the second aspect or any possible implementation manner of the first possible implementation manner of the second aspect to the tenth possible implementation manner of the second aspect, in an eleventh possible implementation manner, the terminal includes a smartphone, a tablet computer, a personal computer, a server, or a workstation.

According to a third aspect, a terminal is provided, and the terminal includes a processor, a memory, a communications interface, a display device, and an input device, where the processor is connected to the memory and connected to, using the communications interface, the display device and the input device, the memory stores a group of program code, and the processor is configured to invoke the program code stored in the memory and perform the following operations: determining first-type authentication information and second-type authentication information that are of the terminal, and presenting a first authentication challenge set on the display device to a user of the terminal using the communications interface, where the first-type authentication information includes specific attribute information that is in specific attribute information of an interaction object corresponding to a specific interaction behavior of the terminal and whose occurrence frequency within a preset time falls in a preset range, the specific attribute information is one type of attribute information of the interaction object or a combination of multiple types of attribute information of the interaction object, the second-type authentication information is used to interfere with selection, by the user of the terminal, of the first-type authentication information, and the first authentication challenge set includes at least one piece of the first-type authentication information and at least one piece of the second-type authentication information; and receiving, using the communications interface and from the input device, an identification result obtained by identifying, by the user of the terminal, the first-type authentication information and the second-type authentication information that are in the first authentication challenge set, and determining an authentication result according to an identification correctness rate of the first-type authentication information in the identification result. The display device is configured to present the first authentication challenge set to the user of the terminal. The input device is configured to input the identification result obtained by identifying, by the user of the terminal, the first-type authentication information and the second-type authentication information that are in the first authentication challenge set.

With reference to the third aspect, in a first possible implementation manner, specific implementation is as follows. The second-type authentication information includes at least one of the following: specific attribute information that is in the specific attribute information of the interaction object corresponding to the specific interaction behavior of the terminal and whose occurrence frequency within the preset time falls outside the preset range; and specific attribute information that does not belong to the specific attribute information of the interaction object corresponding to the specific interaction behavior of the terminal.

With reference to the third aspect or the first possible implementation manner of the third aspect, in a second possible implementation manner, specific implementation is as follows. The first-type authentication information further includes specific attribute information of an interaction object specified in the terminal by the user of the terminal, so as to reduce a memory price of memorizing the first-type authentication information by the user of the terminal.

With reference to the third aspect or the first possible implementation manner of the third aspect or the second possible implementation manner of the third aspect, in a third possible implementation manner, before the processor receives, using the communications interface and from the input device, the identification result obtained by identifying, by the user of the terminal, the first-type authentication information and the second-type authentication information that are in the first authentication challenge set, if the interaction object corresponding to the specific interaction behavior of the terminal changes, or the terminal generates a new specific interaction behavior, the processor is further configured to redetermine the first-type authentication information and the second-type authentication information that are of the terminal, so that a second authentication challenge set is presented on the display device to the user of the terminal using the communications interface, where the second authentication challenge set is generated based on the first-type authentication information and the second-type authentication information that are redetermined by the determining unit.

With reference to the third possible implementation manner of the third aspect, in a fourth possible implementation manner, specific implementation is as follows. That the interaction object corresponding to the specific interaction behavior of the terminal changes includes: the interaction object corresponding to the specific interaction behavior of the terminal is added, or the interaction object corresponding to the specific interaction behavior of the terminal is deleted, or the interaction object corresponding to the specific interaction behavior of the terminal is modified.

With reference to the third aspect or any possible implementation manner of the first possible implementation manner of the third aspect to the fourth possible implementation manner of the third aspect, in a fifth possible implementation manner, specific implementation is as follows. The specific interaction behavior of the terminal includes a behavior that the terminal accesses a contact in the terminal, and the first-type authentication information and the second-type authentication information are specific attribute information of the contact; or the specific interaction behavior of the terminal includes a behavior that the terminal accesses an audio and video file in the terminal, and the first-type authentication information and the second-type authentication information are specific attribute information of the audio and video file; or the specific interaction behavior of the terminal includes a behavior that the terminal accesses an application in the terminal, and the first-type authentication information and the second-type authentication information are specific attribute information of the application; or the specific interaction behavior of the terminal includes a behavior that the terminal accesses a website, and the first-type authentication information and the second-type authentication information are specific attribute information of the website; or the specific interaction behavior of the terminal includes a behavior that the terminal accesses a picture in the terminal, and the first-type authentication information and the second-type authentication information are specific attribute information of the picture; or the specific interaction behavior of the terminal includes a behavior that the terminal accesses an ebook in the terminal, and the first-type authentication information and the second-type authentication information are specific attribute information of the ebook; or the specific interaction behavior of the terminal includes a behavior that the terminal communicates with a device outside the terminal, and the first-type authentication information and the second-type authentication information are information about a geographical area in which the terminal is located when the terminal communicates with the device outside the terminal.

With reference to the third aspect or any possible implementation manner of the first possible implementation manner of the third aspect to the fifth possible implementation manner of the third aspect, in a sixth possible implementation manner, the processor is further configured to configure the preset time, the preset range, and a quantity N of pieces of the first-type authentication information that needs to be identified for performing authentication on the user of the terminal. In a process of determining the authentication result according to the identification correctness rate of the first-type authentication information in the identification result, the processor is specifically configured to determine, when the quantity of pieces of the first-type authentication information that is identified by the user of the terminal and is in the identification result is not less than N, that the authentication on the user of the terminal succeeds; or determine, when the quantity of pieces of the first-type authentication information that is identified by the user of the terminal and is in the identification result is less than N, that the authentication on the user of the terminal fails.

With reference to the sixth possible implementation manner of the third aspect, in a seventh possible implementation manner, when the preset time is longer and the preset range is larger, a set of the first-type authentication information is larger, and security strength of the authentication on the user of the terminal is higher; when the quantity of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

With reference to the third aspect or any possible implementation manner of the first possible implementation manner of the third aspect to the seventh possible implementation manner of the third aspect, in an eighth possible implementation manner, specific implementation is as follows. The preset range is a range in which a quantity of occurrence times of the specific attribute information of the interaction object corresponding to the specific interaction behavior of the terminal within the preset time exceeds a preset quantity of times, or a range in which a quantity of occurrence times of the specific attribute information of the interaction object corresponding to the specific interaction behavior of the terminal within the preset time exceeds a preset percentage of a total quantity of occurrence times, or a range in which ranking of a quantity of occurrence times of the specific attribute information of the interaction object corresponding to the specific interaction behavior of the terminal within the preset time falls within preset ranking, or a range in which ranking of a quantity of occurrence times of the specific attribute information of the interaction object corresponding to the specific interaction behavior of the terminal within the preset time falls within a preset percentage.

With reference to the third aspect or any possible implementation manner of the first possible implementation manner of the third aspect to the eighth possible implementation manner of the third aspect, in a ninth possible implementation manner, the processor is further configured to configure a set of excluded authentication information of the terminal, where authentication information in the set of excluded authentication information cannot be used as the first-type authentication information. In a process of determining the first-type authentication information of the terminal, the processor is specifically configured to determine that specific attribute information that is in the specific attribute information of the interaction object corresponding to the specific interaction behavior of the terminal, whose occurrence frequency within the preset time falls in the preset range, and that does not belong to the set of excluded authentication information is the first-type authentication information.

With reference to the third aspect or any possible implementation manner of the first possible implementation manner of the third aspect to the ninth possible implementation manner of the third aspect, in a tenth possible implementation manner, the processor is further configured to generate the first authentication challenge set according to the first-type authentication information and the second-type authentication information that are of the terminal, so as to present the first authentication challenge set to the user of the terminal.

With reference to the third aspect or any possible implementation manner of the first possible implementation manner of the third aspect to the tenth possible implementation manner of the third aspect, in an eleventh possible implementation manner, the terminal includes a smartphone, a tablet computer, a personal computer, a server, or a workstation.

With reference to the third aspect or any possible implementation manner of the first possible implementation manner of the third aspect to the eleventh possible implementation manner of the third aspect, in a twelfth possible implementation manner, the display device and the input device are a same device that is in the terminal and has both a display function and an input function; or the display device and the input device are different devices in the terminal.

Based on the foregoing technical solutions, in the user authentication method, the authentication apparatus, and the terminal in the embodiments of the present invention, identity authentication is performed using specific attribute information of a specific interaction object that is most frequently used by a user recently. Because the specific attribute information of the specific interaction object that is most frequently used recently belongs to information within a memory period of the user, a memory price of the user can be reduced, and meanwhile, authentication information that appears each time is not fixed, which can also avoid the authentication information from being stolen due to a peep, resulted from incaution, at the authentication information, thereby reducing the memory price of the user and having a certain anti-peeping capability at the same time.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
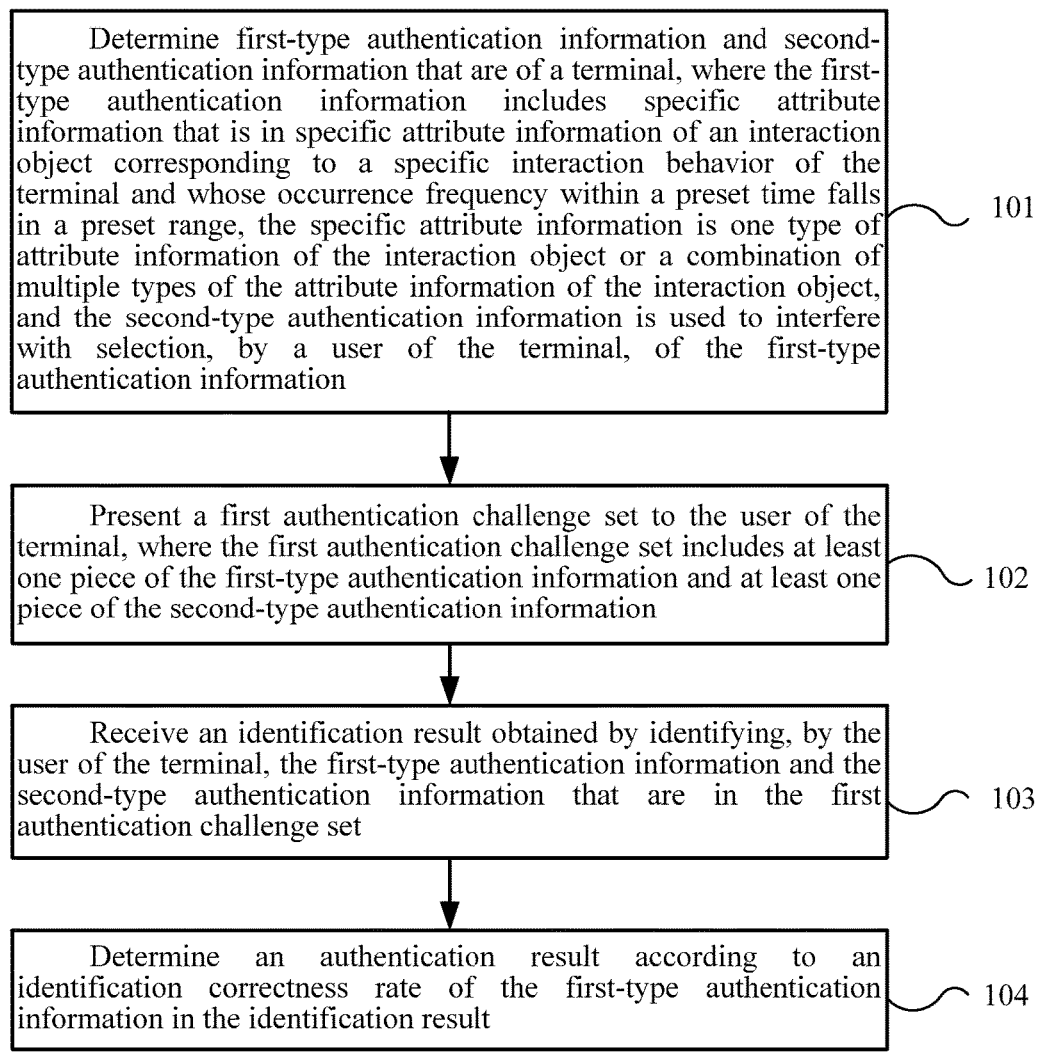
FIG. 1 is a flowchart of a user authentication method according to an embodiment of the present invention.

FIG. 1 is a flowchart of a user authentication method according to an embodiment of the present invention. The method in FIG. 1 is performed by an authentication apparatus. The authentication apparatus may be an authentication module in a system inside a terminal, or a chip that is in a terminal and implements an authentication function, which is not limited in this embodiment of the present invention herein.

101. Determine first-type authentication information and second-type authentication information that are of a terminal.

The first-type authentication information includes specific attribute information that is in specific attribute information of an interaction object corresponding to a specific interaction behavior of the terminal and whose occurrence frequency within a preset time falls in a preset range, the specific attribute information is one type of attribute information of the interaction object or a combination of multiple types of the attribute information of the interaction object, and the second-type authentication information is used to interfere with selection, by a user of the terminal, of the first-type authentication information.

It should be understood that the specific interaction behavior refers to an interaction behavior used to determine an occurrence frequency in an authentication process. The interaction object corresponding to the specific interaction behavior refers to a source for collecting the first-type authentication information, and the specific attribute information of the interaction object may be used to construct the first-type authentication information.

It should be understood that the specific attribute information is one type of attribute information of the interaction object or a combination of multiple types of the attribute information of the interaction object, or may be a unique identifier, a name, a picture, a name plus a picture, or the like.

It should be understood that specific attribute information of different interaction objects may be the same. For example, audio files in a same album have a same album name. For another example, authors of several different ebooks may be a same author, and the like. When the first-type authentication information is confirmed, the first-type authentication information is determined using an occurrence frequency of the specific attribute information of the interaction object corresponding to the specific interaction behavior.

It should be understood that the second-type authentication information may include at least one of the following: specific attribute information that is in the specific attribute information of the interaction object corresponding to the specific interaction behavior of the terminal and whose occurrence frequency within the preset time falls outside the preset range; and specific attribute information that does not belong to the specific attribute information of the interaction object corresponding to the specific interaction behavior of the terminal.

Optionally, the specific interaction behavior of the terminal is an interaction behavior specified in the authentication process. The specific interaction behavior of the terminal may have multiple forms of expression, and accordingly, the first-type authentication information and the second-type authentication information may also have multiple forms of expression. For example, the specific interaction behavior of the terminal may include a behavior that the terminal accesses a contact in the terminal, and the first-type authentication information and the second-type authentication information are specific attribute information of the contact; or the specific interaction behavior of the terminal may include a behavior that the terminal accesses an audio and video file in the terminal, and the first-type authentication information and the second-type authentication information are specific attribute information of the audio and video file; or the specific interaction behavior of the terminal may include a behavior that the terminal accesses an application in the terminal, and the first-type authentication information and the second-type authentication information are specific attribute information of the application; or the specific interaction behavior of the terminal may include a behavior that the terminal accesses a website, and the first-type authentication information and the second-type authentication information are specific attribute information of the website; or the specific interaction behavior of the terminal may include a behavior that the terminal accesses a picture in the terminal, and the first-type authentication information and the second-type authentication information are specific attribute information of the picture; or the specific interaction behavior of the terminal may include a behavior that the terminal accesses an ebook in the terminal, and the first-type authentication information and the second-type authentication information are specific attribute information of the ebook; or the specific interaction behavior of the terminal may include a behavior that the terminal communicates with a device outside the terminal, and the first-type authentication information and the second-type authentication information are information about a geographical area in which the terminal is located when the terminal communicates with the device outside the terminal. In a specific implementation manner of this embodiment of the present invention, when the first-type authentication information is the specific attribute information of the contact, information about the contact may be a photo of the contact, a name of the contact, a phone number of the contact, a name plus a picture of the contact, or the like. In another specific implementation manner of this embodiment of the present invention, when the first-type authentication information is information about an audio file, the information about the audio file may be a name of the audio file, an album name of the audio file, a performer of the audio file, or the like.

Optionally, the terminal may have multiple specific implementation forms, such as a smartphone, a tablet computer, a personal computer, a server, or a workstation. The terminal may also be another device that has an authentication function, which is not limited in this embodiment of the present invention herein.

It should be understood that the first-type authentication information includes the specific attribute information that is in the specific attribute information of the interaction object corresponding to the specific interaction behavior of the terminal and whose occurrence frequency within the preset time falls in the preset range, where the occurrence frequency falls in the preset range, and this range may be an absolute frequency range, or may be a relative frequency range. For example, the preset range is a range in which a quantity of occurrence times of the specific attribute information of the interaction object corresponding to the specific interaction behavior of the terminal within the preset time exceeds a preset quantity of occurrence times, or a range in which a quantity of occurrence times of the specific attribute information of the interaction object corresponding to the specific interaction behavior of the terminal within the preset time exceeds a preset percentage of a total quantity of occurrence times, or a range in which ranking of a quantity of occurrence times of the specific attribute information of the interaction object corresponding to the specific interaction behavior of the terminal within the preset time falls within preset ranking, or a range in which ranking of a quantity of occurrence times of the specific attribute information of the interaction object corresponding to the specific interaction behavior of the terminal within the preset time falls within a preset percentage. For example, the first-type authentication information may be a name of a contact whose quantity of talk times within three days exceeds five times, or a name of an ebook whose quantity of ebook reading times within two days exceeds 10 percent (%) of a total quantity of reading times within two days, or a music album whose playing ranking within five days is on the top three, or a website whose website access frequency within 12 hours is in the first 5%, or the like.

It should be understood that both the preset time and the preset range are configurable. For example, the preset time may be configured as 12 hours, one day, two days, three days, or even one month, or the like, which is not limited in this embodiment of the present invention. For another example, the preset range may be configured as more than one time, more than five times, or first five or first 5% of all occurrence frequencies, or the like.

Optionally, the first-type authentication information further includes specific attribute information of an interaction object specified in the terminal by the user of the terminal, so as to reduce a memory price of memorizing the first-type authentication information by the user of the terminal.

Optionally, before step 101, the method may further include configuring a set of excluded authentication information of the terminal, where authentication information in the set of excluded authentication information cannot be used as the first-type authentication information. In this case, in step 101, specific implementation of the determining first-type authentication information of a terminal may be as follows: determining that specific attribute information that is in the specific attribute information of the interaction object corresponding to the specific interaction behavior of the terminal, whose occurrence frequency within the preset time falls in the preset range, and that does not belong to the set of excluded authentication information is the first-type authentication information.

102. Present a first authentication challenge set to a user of the terminal.

The first authentication challenge set includes at least one piece of the first-type authentication information and at least one piece of the second-type authentication information.

103. Receive an identification result obtained by identifying, by the user of the terminal, the first-type authentication information and the second-type authentication information that are in the first authentication challenge set.

104. Determine an authentication result according to an identification correctness rate of the first-type authentication information in the identification result.

In this embodiment of the present invention, authentication information is dynamically generated using specific attribute information of an interaction object that is in the terminal and whose occurrence frequency within a preset time is preset, to perform authentication on a user. Because information about a recently most frequently used specific interaction object belongs to information within a memory period of the user, a memory price of the user can be reduced, and meanwhile, authentication information that appears each time is not fixed, which can also avoid the authentication information from being stolen due to a peep, resulted from incaution, at the authentication information. Therefore, the authentication method in this embodiment of the present invention reduces the memory price of memorizing the authentication information by the user, and also has a certain anti-peeping capability at the same time.

In addition, in the method in this embodiment of the present invention, because the authentication information can be generated based on an access frequency, to perform authentication on the user, using experience of the user can further be improved.

Optionally, before step 103, the method may further include, if the interaction object corresponding to the specific interaction behavior of the terminal changes, or the terminal generates a new specific interaction behavior, redetermining the first-type authentication information and the second-type authentication information that are of the terminal, and presenting a second authentication challenge set to the user of the terminal, where the second authentication challenge set is generated based on the redetermined first-type authentication information and second-type authentication information. In a specific application, that the interaction object corresponding to the specific interaction behavior of the terminal changes includes: the interaction object corresponding to the specific interaction behavior of the terminal is added, or the interaction object corresponding to the specific interaction behavior of the terminal is deleted, or the interaction object corresponding to the specific interaction behavior of the terminal is modified. It should be understood that a behavior resulting in a change of the first-type authentication information and second-type authentication information is not limited to the foregoing enumerated situations, and a situation resulting in a change of the interaction object is not limited to the foregoing enumerated situations either.

Optionally, before step 101, the method may further include configuring the preset time, the preset range, and a quantity N of pieces of the first-type authentication information that needs to be identified for performing authentication on the user of the terminal. It should be understood that the quantity of pieces of the first-type authentication information that needs to be identified for performing authentication on the user of the terminal is a quantity of pieces of the first-type authentication information that needs to be identified from the first authentication challenge set by the user of the terminal in a user authentication process. In this case, specific implementation of step 104 is as follows: determining, when the quantity of pieces of the first-type authentication information that is identified by the user of the terminal and is in the identification result is not less than N, that the authentication on the user of the terminal succeeds; or determining, when a quantity of pieces of the first-type authentication information that is identified by the user of the terminal and is in the identification result is less than N, that the authentication on the user of the terminal fails. A value of N is a positive integer.

The configuring the preset time, the preset range, and a quantity of pieces of the first-type authentication information that needs to be identified for performing authentication on the user of the terminal may include adjusting, by configuring the preset time, the preset range, and the quantity of pieces of the first-type authentication information that needs to be identified for performing authentication on the user of the terminal, security strength of the authentication on the user of the terminal. If the preset time is longer and the preset range is larger, a set of the first-type authentication information is larger, and the security strength of the authentication on the user of the terminal is higher; if the quantity of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

Optionally, before step 102, the method further includes generating the first authentication challenge set according to the first-type authentication information and the second-type authentication information that are of the terminal, so as to present the first authentication challenge set to the user of the terminal.

The method in this embodiment of the present invention is further described below with reference to a specific embodiment.

Figure 2:
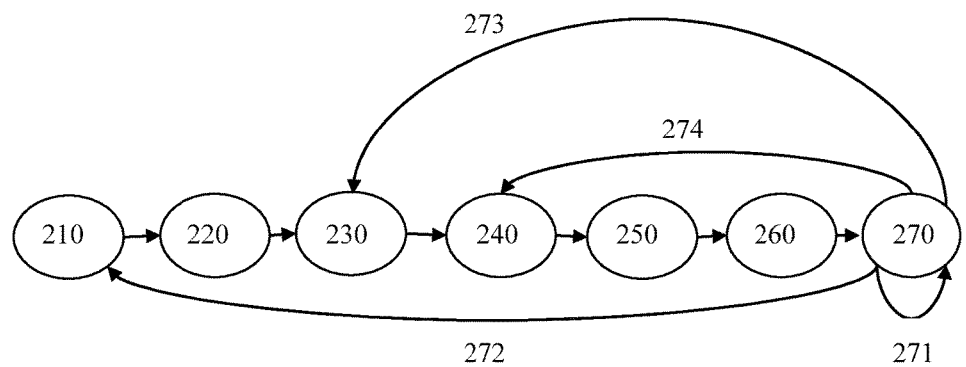
FIG. 2 is a schematic flowchart of performing user authentication using contact information according to an embodiment of the present invention.

FIG. 2 is a schematic flowchart of performing user authentication using contact information according to an embodiment of the present invention. In this embodiment of the present invention, authentication information is specific attribute information of a contact. In this case, an occurrence frequency of the specific attribute information of the contact is equal to an access frequency of accessing the contact by a user of a terminal, and an authentication apparatus performs user authentication according to specific attribute information of a contact that is frequently accessed in the terminal recently. The contact in this embodiment of the present invention may be a contact in an address book of a terminal, a contact of an email, or another contact of social software; the specific attribute information of the contact may be a name of the contact, a name plus a picture of the contact, or the like, which is not limited in this embodiment of the present invention herein. For ease of description, contact information mentioned below refers to specific attribute information of a contact.

First-type authentication information includes specific attribute information that is in specific attribute information of an interaction object corresponding to a specific interaction behavior of the terminal and whose access frequency within a preset time falls in a preset range. In this embodiment of the present invention, the first-type authentication information is contact information that is in contact information of the terminal and whose access frequency within a preset time falls in a preset range, that is, information about a contact that is frequently accessed recently, and the information about the contact may be a name of the contact, a name plus a picture of the contact, or the like. Second-type authentication information is used to interfere with determining, by the user of the terminal, on the first-type authentication information. The second-type authentication information may be specific attribute information that is in the specific attribute information of the interaction object corresponding to the specific interaction behavior of the terminal and whose access frequency within the preset time falls outside the preset range, or specific attribute information that does not belong to the specific attribute information of the interaction object corresponding to the specific interaction behavior of the terminal. In this embodiment of the present invention, the second-type authentication information may be contact information whose access frequency within the preset time falls outside the preset range, or contact information that does not belong to the terminal.

It should be understood that, in this embodiment of the present invention, contact information of different contacts is generally different. That is, determining a contact may be equal to determining contact information.

As shown in FIG. 2, detailed steps of an initial authentication process in this embodiment of the present invention are specifically as follows.

210. Configure an authentication parameter.

A user may configure a working manner of an authentication apparatus, and a configured parameter may be saved in a configuration database of the authentication apparatus.

The user may perform the following configurations.

(1) an excluded contact (which may be denoted as NP), that is, an excluded interaction object. An element of a set NP does not appear in a first-type contact. To avoid confusion, the element in the set NP does not appear in a second-type contact either.

(2) a parameter of a first-type contact selection method, which may include a valid time requirement (denoted as T, for example, three days, five days, or 10 hours) on a record of accessing a contact, and a contact access frequency requirement (denoted as X, representing a preset quantity of times, for example, five times, or representing preset ranking, for example, the top three, or representing a preset percentage, for example, 3%). A first-type contact determined based on T and X may be denoted as L. The user may not perform configuration either. The parameter of the first-type contact selection method may be set to a default setting for the authentication apparatus. In addition, the user may also specify one or multiple contacts as a fixed first-type contact, instead of obtaining the first-type contact by temporarily calculating the foregoing T and X. The first-type contact specified by the user may be denoted as D.

(3) a parameter of a second-type contact, which may include a quantity (denoted as f) of confounding items at the time of constructing authentication information and/or a quantity (denoted as i) of interfering items at the time of constructing authentication information. A confounding item refers to a fake contact that is randomly generated by a system or a contact that does not exist in the terminal, and an interfering item refers to a contact that the user does not contact recently.

(4) an authentication selection parameter, which may include a quantity (denoted as c, for example, authentication succeeds only when three first-type contacts are correctly selected at the same time) of first-type contacts that need to be correctly selected at the same time during authentication each time. A security strength adjustment function may be further introduced into the authentication apparatus, and security strength of identity authentication may be adjusted by adjusting values of the foregoing f, i, and c. Obviously, when these three values are larger, the security strength is higher. The authentication apparatus may set different difficulty levels, where each level corresponds to a different value, which may be implemented using a security strength drag bar or a difficulty selection box; or the authentication apparatus may provide a value adjustment function, to separately adjust the foregoing three values.

After the configuration is completed, the authentication apparatus automatically loads a corresponding configuration parameter when authentication starts.

It should be understood that, in this embodiment of the present invention, information about the first-type contact is first-type authentication information, and information about the second-type contact is second-type authentication information.

220. Read a contact of a terminal.

The authentication apparatus may read an address book maintained in the terminal and put the address book into a set M. For an address book in the terminal, the authentication apparatus may acquire contact information using an application programming interface (API) of the system; for an email or another social program, the authentication apparatus may acquire contact information using a plug-in of a software program or using a system API Hook.

230. Determine a set of a first-type contact.

If the user specifies to use the set D or there are not enough contact records in the terminal, the authentication apparatus directly adds all elements in D into the set L; otherwise, the authentication apparatus reads, using the API of the system, a contact record N that falls within a time T and is maintained by a phone program, an email program, or another social software that are of the terminal device, removes a contact record of a contact that is in the set NP or is not in the address book of the terminal, calculates an occurrence frequency of each contact and ranks the occurrence frequencies, obtains a group of contacts whose contact frequency meets a requirement, and puts the group of contacts into the set L. There are multiple methods for calculating the contact frequency. For example, only a record of contact actively initiated outward by a terminal owner is included, and a record of contact initiated by a contact with the terminal owner is ignored, or both of the two are included. The set L constructed in this case is the set of the first-type contact.

In addition, when the first-type contact is determined using T and X, a range of the first-type contact may be determined according to content represented by X. In a first specific implementation manner of this embodiment of the present invention, X represents a preset number of access times, and in this case, it may be determined that a contact whose access frequency within a preset time exceeds the preset number of access times is the first-type contact. For example, a contact whose access frequency within three days exceeds five times is the first-type contact. In a second specific implementation manner of this embodiment of the present invention, X represents a first preset percentage of a total quantity of access times, and in this case, it may be determined that a contact whose access frequency within a preset time exceeds the first preset percentage of the total quantity of access times is the first-type contact, where the total quantity of access times is a total quantity of times of access to contacts within the preset time, for example, a contact whose access frequency within five days exceeds 3% of the total quantity of access times. In a third specific implementation manner of this embodiment of the present invention, X represents preset ranking of an access frequency, and in this case, it may be determined that a contact whose rank of an access frequency within the preset time falls within the preset ranking is the first-type contact, such as, a contact whose access frequency rank within 10 hours is on the top three. In a fourth specific implementation manner of this embodiment of the present invention, X represents a second preset percentage of ranking of an access frequency, and in this case, it may be determined that a contact whose rank of an access frequency within the preset time exceeds the second preset percentage is the first-type contact, for example, a contact whose rank of an access frequency within five days is in the first 3%.

There may also be another method for determining the first-type contact, which is not limited in this embodiment of the present invention herein.

240. Determine a first-type contact that is involved in authentication and an interfering item that is in a second-type contact and is involved in authentication.

In this embodiment of the present invention, an interfering item refers to information about a contact that has not been accessed by the user recently.

The authentication apparatus selects, according to configuration information, a subset R whose number of elements is i from the set M, where it is required that the user has not contacted a contact in the set R recently and all elements in the set R are not in L; and then selects a subset V whose size is c from the set L, and uses the subset V as a first-type contact that needs to be identified by the user in this authentication.

If the set L includes all contacts in the system, the set R is empty, and in this case, a solution is simplified to require that the user identifies, from a contact set including a fake contact, a contact that really exists.

In addition, to reduce a memory difficulty, a quantity of elements in V may be further increased, that is, a quantity of elements in V may be more than c.

250. Determine a confounding item in the second-type contact.

In this embodiment of the present invention, a confounding item refers to a fake contact that is randomly generated by the system, or a contact that does not exist in the terminal.

The authentication apparatus generates a group of fake contacts, where a quantity of fake contacts is f and the group is denoted as F. A fake contact may be formed, by means of a random combination, according to a common surname, a common name, and related information (such as a profile picture) that are initially configured in the system, or may be acquired by connecting a remote network service. An element in the set F cannot appear in the set L or D. Strictly, the element in the set F cannot appear in the set R either.

The confounding item may not be generated either, and in this case, f is 0 and the set F is an empty set.

260. Generate an authentication challenge set.

The authentication apparatus disorganizes elements in the sets V, R, and F, to form an authentication challenge set A, that is, A=V+R+F (where a symbol "+" represents adding the sets).

270. Present the authentication challenge set and confirm an authentication result.

The authentication apparatus presents the authentication challenge set A to the user, so that the user performs identification.

The authentication apparatus may determine the authentication result according to an authentication identification result of the user. If the user can select c elements in V from the authentication challenge set A, authentication succeeds; otherwise, authentication fails.

For example, 24 pieces of contact information may be presented to the user. If the user can select three pieces of correct contact information from the 24 pieces of contact information, the authentication succeeds; otherwise, the authentication fails.

In this embodiment of the present invention, at the time of calculating the first-type contact, weighted calculation may be performed according to time duration from a time when a contact behavior is generated to a current time, or the user may also directly specify a group of fixed contacts as a permanent first-type contact, which, in this case, equals to that this group of fixed contacts are endowed with a largest weight. By introducing the fake contact set F in a process of constructing a contact set A that is finally displayed on a screen, a size of selection space may be increased, which plays a confounding function; in addition, information in the sets R and V may further be protected, thereby avoiding an attacker from directly obtaining, by deduction, a contact that really exists in the terminal. In addition, by introducing the set R, a selection difficulty may be further increased, thereby avoiding an attacker who is familiar with a current terminal owner from directly obtaining, by means of a guess, the first-type contact according to background knowledge, of the attacker, about a possible common contact of the terminal owner.

As shown in FIG. 2, the method in this embodiment of the present invention can support multiple operating modes. When operation is performed for the first time upon startup or when authentication parameter configuration changes, an initial authentication mode needs to be executed. In the initial authentication mode, the foregoing steps 210 to 270 need to be performed. As shown by a direction of an arrow 272 in FIG. 2, after authentication ends, if the authentication parameter configuration changes, the initial authentication mode directly starts from step 210, so as to perform steps 210 to 270. After the user generates a new contact behavior, in this case, the first-type contact of the user may have already changed, and the authentication apparatus needs to execute a contact authentication mode. In a theoretical situation, the authentication apparatus may execute the contact authentication mode in any step before step 270 and after step 230. However, in an actual situation, generally, no interaction behavior except authentication is generated in the authentication process, and another interaction behavior is possibly generated only after the authentication ends. As shown by a direction of an arrow 273 in FIG. 2, in this case, the contact authentication mode starts from step 230, so as to perform steps 230 to 270. Reselection authentication is used mainly when the user expects that a strongest anti-peeping capability is provided or when a quantity of user authentication error times is excessively large, which requires that a subset V recalculated each time is different under a premise that the set L remains unchanged, and reselection may be performed $C_{|L|}^{|V|}$ (combination calculation) times at most. Similar to the contact authentication mode, a reselection authentication mode needs to be executed after last authentication is completed. As shown by a direction of an arrow 274 in FIG. 2, in this case, the reselection authentication mode starts from step 240, and steps 240 to 270 need to be performed in the reselection authentication mode. In an unchanged authentication mode, the set A remains totally unchanged, and authentication is performed on the user based on a same secret and same interference information. As shown by a direction of an arrow 271 in FIG. 2, in this case, in the unchanged authentication mode, only step 270 needs to be performed again.

In the unchanged authentication mode, if there is an error of current user authentication, next authentication is still performed based on same interference and a same secret. By means of step-by-step trials and errors, a quantity of combinations of excluded contacts gradually increases, and a possibility that an attacker makes a correct guess increases, but a descending speed is extremely slow. For example, it is assumed that the set A includes 24 elements and it is required to identify three first-type contacts (a size of the set V is three) at the time of authentication, a probability that the attacker makes a correct guess at the beginning is 1/2024 (a quantity of combinations of three contacts is 24*23*22/6=2024). After the attacker tries m times, a probability of making a correct guess changes to 1/2014-m. Therefore, it can be learned that, with a common parameter value, this solution resists a guess attack for thousands of times. In a situation with consecutive authentication errors of the user, authentication is performed after being delayed for a period of time (such as 30 seconds), and this solution can resist the guess attack for a long time. To further improve an anti-guessing capability, after authentication errors occur consecutively for specific times, the system performs reselection authentication once, and can recalculate the challenge set A and then reenter the unchanged authentication mode.

In various existing authentication solutions, for example, a password, because a secret is fixed, once the secret is peeped at during authentication, an attacker can grasp all authentication secrets and completely break through an authentication mechanism. An authentication secret in this solution is based on the first-type contact, which is information changing dynamically and constantly. It is assumed that the attacker obtains, by means of a peep, a secret (a group of the first-type contact at that time) of last authentication of the user and is capable of getting a terminal of the user, the attacker may try to perform authentication based on the previously obtained secret. In many situations, an actual user of the terminal has already generated several new communication behaviors, and in this case, the first-type contact has already changed, then the previous authentication secret is invalid. This solution has a complete anti-peeping capability. In few situations, even if the user does not generate any new communication behavior, if the user is particularly concerned with anti-peeping, the system may be set to perform reselection authentication each time, so that authentication is performed on the user based on a different secret each time, and by combining an authentication error delay, a better anti-peeping capability can be provided. For example, the user has eight first-type contacts that match a condition (|L|=8), and if it is required that three frequently contacted contacts (|v|=3) are selected each time, before reselection authentication is performed 56 times, a secret for each authentication is different.

In the method in this embodiment of the present invention, contact information that really exists in a terminal is protected using a fake contact set F, thereby avoiding leakage of privacy information. If an attacker has no background knowledge about a possible contact of a current terminal owner, it is difficult for the attacker to differentiate some real contacts in the terminal from fake contacts using display information on a terminal screen. Therefore, in this case, this solution may not cause extra information leakage. If an attacker M has background knowledge about both a current terminal owner N and a contact 0 of N and gets a terminal of N, in this case, maximum information that M can obtain from the terminal of N is that N and 0 know each other. In this case, the amount of this privacy leakage is extremely small.

Figure 3:
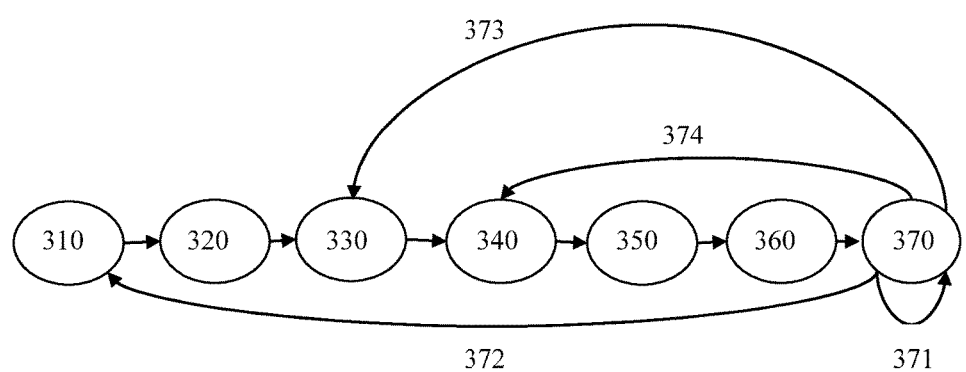
FIG. 3 is a schematic flowchart of performing user authentication using information about a played musical work according to an embodiment of the present invention.

FIG. 3 is a schematic flowchart of performing user authentication using information about a played musical work according to an embodiment of the present invention. In this embodiment of the present invention, authentication information is specific attribute information of an audio file, such as a name of the audio file, an album name of the audio file, a performer of music in the audio file, or a singer, band, or orchestra of music in the audio file. In this embodiment of the present invention, identification on a terminal owner (that is, a user) is implemented by making the user recall and select a musical work that the user frequently plays and listens to recently or a performer of the musical work. For ease of description, musical work information mentioned below is specific attribute information of an audio file.

In this embodiment of the present invention, an authentication apparatus may acquire musical work information of an audio file in various manners. For example, the authentication apparatus may include an audio file monitoring module that is configured to monitor an audio file in a system of a terminal and an opening situation of the audio file.

In this embodiment of the present invention, first-type authentication information is musical work information whose occurrence frequency within a preset time falls in a preset range. It should be understood that one piece of musical work information may possibly correspond to multiple audio files. For example, when the musical work information is an album name, musical work information of all audio files that belong to a same album is the same, and when an occurrence frequency is calculated, calculation should be performed by combining the musical work information of all the audio files that belong to the same album together. Second-type authentication information is musical work information that is used to interfere with determining of the user.

As shown in FIG. 3, detailed steps of an initial authentication process in this embodiment of the present invention are specifically as follows.

310. Configure an authentication parameter.

A user may configure a working manner of an authentication apparatus, and a configured parameter may be saved in a configuration database of the authentication apparatus.

The user may perform the following configurations.

(1) excluded musical work information (which may be denoted as NP). Musical work information (such as an album, a performer, a singer, or a band) specified in this part is not involved in a process of generating authentication information, so that the user is allowed to directly exclude some sensitive songs or a well-known favorite artist of a terminal owner. In other words, an element in a set NP does not appear in first-type musical work information. To avoid confusion, the element in the set NP does not appear in second-type musical work information either.

(2) a parameter of a first-type musical work information selection method, which may include a valid time requirement (denoted as T, for example, three days, five days, or 10 hours) on playback of a musical work, and a musical work information occurrence frequency requirement (denoted as X, representing a preset quantity of times, for example, five times, or representing preset ranking, for example, the top three, or representing a preset percentage, for example, 3%). First-type musical work information determined based on T and X may be denoted as L. The user may not perform configuration either. The parameter of the first-type musical work information selection method may be set to a default setting for the authentication apparatus. In addition, the user may also specify one or multiple pieces of musical work information as fixed first-type musical work information, instead of obtaining the first-type musical work information by temporarily calculating the foregoing T and X. The first-type musical work information specified by the user may be denoted as D.

(3) a parameter of second-type musical work information, which may include a quantity (denoted as f) of confounding items at the time of constructing authentication information and/or a quantity (denoted as i) of interfering items at the time of constructing authentication information. A confounding item refers to fake musical work information that is randomly generated by a system or information about a musical work that does not exist in the terminal, and an interfering item refers to musical work information that does not appear in a musical work played by the user recently.

(4) an authentication selection parameter, which may include a quantity (denoted as c, for example, authentication succeeds only when three pieces of the first-type musical work information are correctly selected at the same time) of pieces of the first-type musical work information that needs to be correctly selected at the same time during authentication each time. A security strength adjustment function may be further introduced into the authentication apparatus, and security strength of identity authentication may be adjusted by adjusting values of the foregoing f, i, and c. Obviously, when these three values are larger, the security strength is higher. The authentication apparatus may set different difficulty levels, where each level corresponds to a different value, which may be implemented using a security strength drag bar or a difficulty selection box; or the authentication apparatus may provide a value adjustment function, to separately adjust the foregoing three values.

After the configuration is completed, the authentication apparatus automatically loads a corresponding configuration parameter when authentication starts.

It should be understood that, in this embodiment of the present invention, the first-type musical work information is first-type authentication information, and the second-type musical work information is second-type authentication information.

320. Read musical work information of a terminal.

The authentication apparatus may include an audio file monitoring module that is used to monitor a playback situation of an audio file. The authentication apparatus may read, using the audio file monitoring module, a list (denoted as L1) of all audio files stored in the terminal and performers of the audio files, and a recent audio file playlist (denoted as L2). If an audio file monitoring switch is on, a manner such as a Hook system file opening function may be used to monitor an opening operation on an audio file in the system of the terminal and continuously update information recorded in a database. The authentication apparatus may also implement the foregoing function using a functional module similar to the audio file monitoring module, which is not limited in this embodiment of the present invention herein.

330. Determine a set of first-type musical work information.

If the user specifies the set D or there are not enough music playback records in the terminal, all elements in D are put into the set L; otherwise, the module calculates a playback frequency of music and a playback frequency of a performer according to L2, and selects a group of recently frequently played music or a group of recently frequently played work performers and puts the group into the set L. If a quantity of elements in L is smaller than c, a list of all audio files, or corresponding performers of all audio files may be put into the set L.

A specific implementation manner of determining the set of the first-type musical work information using T and X is similar to a manner of determining a first-type contact in step 230. Details are not described herein again in this embodiment of the present invention.

The set L constructed in this case is the set of the first-type musical work information.

340. Determine first-type musical work information that is involved in authentication and an interfering item that is in second-type musical work information and is involved in authentication.

In this embodiment of the present invention, an interfering item refers to musical work information that does not appear in a musical work played by the user recently.

The authentication apparatus selects, according to configuration information, a subset R whose size is i from the set L1, where it is required that all elements in R do not appear in the set L2 (these pieces of musical work information have not appeared recently) and all the elements in R are not in L; and then selects a subset V whose size is c from the set L, and uses the subset V as first-type musical work information that needs to be identified by the user in this authentication. If L includes all audio files in the terminal, R is empty and there is no interfering item, and in this case, a solution is simplified to require that the user identifies, from a set including fake musical work information, musical work information that really exists in the terminal.

In addition, to reduce a memory difficulty, a quantity of elements in V may be further increased, that is, a quantity of elements in V may be more than c.

350. Acquire a confounding item in the second-type musical work information.

In this embodiment of the present invention, a confounding item refers to musical work information that is randomly generated by the system, or information about a musical work that does not exist in the terminal.

The authentication apparatus generates a group of fake musical work information (fake music, music album, performer, or the like), where a quantity of pieces of fake musical work information is f and the group is denoted as a set F. The fake musical work information may be formed according to an initially configured music library or performer library in the system, or may be acquired by connecting a remote network service. An element in the set F cannot appear in the set L or D.

The confounding item may not be generated either, and in this case, f is 0 and the set F is an empty set.

360. Generate an authentication challenge set.

The authentication apparatus disorganizes elements in the sets V, R, and F, to form an authentication challenge set A, that is, A=V+R+F (where a symbol "+" represents adding the sets).

370. Present the authentication challenge set and confirm an authentication result.

The authentication apparatus presents the authentication challenge set A to the user, so that the user performs identification.

The authentication apparatus may determine the authentication result according to an authentication identification result of the user. If the user can select c elements in V from the authentication challenge set A, authentication succeeds; otherwise, authentication fails.

In this embodiment of the present invention, at the time of calculating the first-type musical work information, weighted calculation may be performed according to time duration from a time when a playback behavior is generated to a current time, or the user may also directly specify a group of fixed musical work information as the first-type musical work information, which, in this case, equals to that this group of fixed entities are endowed with a largest weight. By introducing the fake musical work information set F in a process of constructing a set A that is finally displayed on a screen, a size of selection space is increased, which plays a confounding function, so as to improve a degree of differentiation on the user; in addition, information in the sets R and V may be further protected. A purpose of introducing the set R in this method is to further improve a selection difficulty and avoid an attacker who knows musical work information existing in the terminal from directly obtaining, by means of a guess, the first-type musical work information.

As shown in FIG. 3, the method in this embodiment of the present invention can support multiple operating modes. When operation is performed for the first time upon startup or when authentication parameter configuration changes, an initial authentication mode needs to be executed. In the initial authentication mode, the foregoing steps 310 to 370 need to be performed. As shown by a direction of an arrow 372 in FIG. 3, after authentication ends, if the authentication parameter configuration changes, the initial authentication mode directly starts from step 310, so as to perform steps 310 to 370. After the user generates a new playback behavior, in this case, the first-type musical work information of the user may have already changed, and the authentication apparatus needs to execute a playback authentication mode. In a theoretical situation, the authentication apparatus may execute the playback authentication mode in any step before step 370 and after step 330. However, in an actual situation, generally, no interaction behavior except authentication is generated in the authentication process, and another interaction behavior is possibly generated only after the authentication ends. As shown by a direction of an arrow 373 in FIG. 3, in this case, the playback authentication mode starts from step 330, so as to perform steps 330 to 370. Reselection authentication is used mainly when the user expects that a strongest anti-peeping capability is provided or when a quantity of user authentication error times is excessively large, which requires that a subset V recalculated each time is different under a premise that the set L remains unchanged, and reselection may be performed $C_{|L|}^{|V|}$ (combination calculation) times at most. Similar to the playback authentication mode, a reselection authentication mode needs to be executed after last authentication is completed. As shown by a direction of an arrow 374 in FIG. 3, in this case, the reselection authentication mode starts from step 340, and steps 340 to 370 need to be performed in the reselection authentication mode. In an unchanged authentication mode, the set A remains totally unchanged, and authentication is performed on the user based on a same secret and same interference information. As shown by a direction of an arrow 371 in FIG. 3, in this case, in the unchanged authentication mode, only step 370 needs to be performed again.

In the unchanged authentication mode, if there is an error of current user authentication, next authentication is still performed based on same interference and a same secret. By means of step-by-step trials and errors, a quantity of combinations of excluded musical works gradually increases, and a possibility that an attacker makes a correct guess increases, but a descending speed is extremely slow. For example, it is assumed that the set A includes 24 elements and it is required to identify three pieces of the first-type musical work information (a size of the set V is three) at the time of authentication, a probability that the attacker makes a correct guess at the beginning is 1/2024 (a quantity of combinations of three pieces of musical work information is 24*23*22/6=2024). After the attacker tries m times, a probability of making a correct guess changes to 1/2014-m. Therefore, it can be learned that, with a common parameter size, this solution resists a guess attack for thousands of times. In a situation with consecutive authentication errors of the user, authentication is performed after being delayed for a period of time (such as 30 seconds), and this solution can resist the guess attack for a long time. To further improve an anti-guessing capability, after authentication errors occur consecutively for specific times, the system performs reselection authentication once, and can recalculate the challenge set A and then reenter the unchanged authentication mode.

In various existing authentication solutions, for example, a password, because a secret is fixed, once the secret is peeped at during authentication, an attacker can grasp all authentication secrets and completely break through an authentication mechanism. An authentication secret in this solution is based on the first-type musical work information, which is information changing dynamically and constantly. It is assumed that the attacker obtains, by means of a peep, a secret (a group of the first-type musical work information at that time) of last authentication of the user and is in a condition of being capable of getting a terminal of the user, the attacker may try to perform authentication based on the previously obtained secret. In many situations, an actual user of the terminal has already generated several new playback behaviors, and in this case, the first-type musical work information has already changed, then the previous authentication secret is invalid. This solution has a complete anti-peeping capability. In few situations, even if the user does not generate any new playback behavior, if the user is particularly concerned with anti-peeping, the system may be set to perform reselection authentication each time, so that authentication is performed on the user based on a different secret each time, and by combining an authentication error delay, a better anti-peeping capability can be provided. For example, the user has eight pieces of the first-type musical work information that match a condition (|L|=8), and if it is required that three pieces of the first-type musical work information (|v|=3) are selected each time, before reselection authentication is performed 56 times, a secret for each authentication is different.

Figure 4:
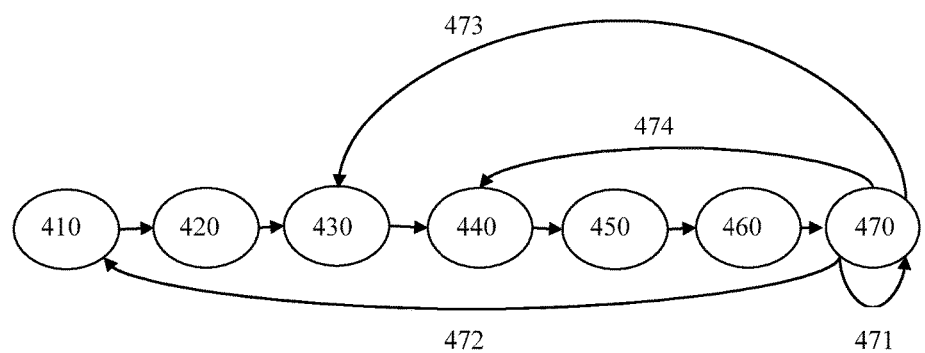
FIG. 4 is a schematic flowchart of performing user authentication using website information of an accessed website according to an embodiment of the present invention.

FIG. 4 is a schematic flowchart of performing user authentication using website information of an accessed website according to an embodiment of the present invention. In this embodiment of the present invention, authentication information is specific attribute information of an accessed website, such as a website identifier used for user identification, such as a website address, a website name, a website icon, or a domain name. For ease of description, website information mentioned below refers to specific attribute information of an accessed website.

In this embodiment of the present invention, an authentication apparatus may acquire website information in various manners. For example, the authentication apparatus may include a website address input monitoring module that is responsible for monitoring and recording website address input of a user in a browser and whose implementation manner may be a browser helper object embedded in a current browser or may be a browser that is independently developed by a phone device manufacturer and supports recording of website address access. The website address input monitoring module can always monitor and record a website address that is input using an address box or a favorites folder of the browser by the user, and website address access that is automatically performed by the browser by automatically opening a window is not recorded.

In this embodiment of the present invention, first-type authentication information is website information whose access frequency within a preset time falls in a preset range. Second-type authentication information is website information that is used to interfere with determining of the user.

As shown in FIG. 4, detailed steps of an initial authentication process in this embodiment of the present invention are specifically as follows.

410. Configure an authentication parameter.

A user may configure a working manner of an authentication apparatus, and a configured parameter may be saved in a configuration database of the authentication apparatus.

The user may perform the following configurations.

(1) excluded website information (which may be denoted as NP). Website information specified in this part is not involved in a process of generating authentication information, so that the user is allowed to directly exclude some websites that the user feels sensitive and does not want to use and some websites regularly accessed by the user almost every day. In other words, an element in a set NP does not appear in first-type website information. To avoid confusion, the element in the set NP does not appear in second-type website information either.

(2) a parameter of a first-type website information selection method, which may include a valid time requirement (denoted as T, for example, three days, five days, or 10 hours) on website information, and a website information occurrence frequency requirement (denoted as X, representing a preset quantity of times, for example, five times, or representing preset ranking, for example, the top three, or representing a preset percentage, for example, 3%). First-type website information determined based on T and X may be denoted as L. The user may not perform configuration either. The parameter of the first-type website information selection method may be set to a default setting for the authentication apparatus. In addition, the user may also specify one or multiple pieces of website information as fixed first-type website information, instead of obtaining the first-type website information by temporarily calculating the foregoing T and X. The first-type website information specified by the user may be denoted as D.

(3) a parameter of second-type website information, which may include a quantity (denoted as f) of confounding items at the time of constructing authentication information and/or a quantity (denoted as i) of interfering items at the time of constructing authentication information. A confounding item refers to fake website information that is randomly generated by a system, that is, website information of a website that the user has never accessed, and an interfering item refers to website information of a website that the user has accessed before but has not accessed recently.

(4) an authentication selection parameter, which may include a quantity (denoted as c, for example, authentication succeeds only when three pieces of the first-type website information are correctly selected at the same time) of pieces of the first-type website information that needs to be correctly selected at the same time during authentication each time. A security strength adjustment function may be further introduced into the authentication apparatus, and security strength of identity authentication may be adjusted by adjusting values of the foregoing f, i, and c. Obviously, when these three values are larger, the security strength is higher. The authentication apparatus may set different difficulty levels, where each level corresponds to a different value, which may be implemented using a security strength drag bar or a difficulty selection box; or the authentication apparatus may provide a value adjustment function, to separately adjust the foregoing three values.

After the configuration is completed, the authentication apparatus automatically loads a corresponding configuration parameter when authentication starts.

It should be understood that, in this embodiment of the present invention, the first-type website information is first-type authentication information, and the second-type website information is second-type authentication information.

420. Read website information of a terminal.

The authentication apparatus may include a website address input monitoring module that is used to monitor an accessed website. The authentication apparatus may read, using the website address input monitoring module, a website address access record (denoted as a list List) that is of the user and is stored in the terminal. If a monitoring switch is on, the website address input monitoring module may be used to monitor website address input of the user and update the list List. Website information in the set NP or the set D may not be recorded. The authentication apparatus may also implement the foregoing function using a functional module similar to the website address input monitoring module, which is not limited in this embodiment of the present invention herein.

430. Determine a set of first-type website information.

After initial startup or the List is updated, the module selects a group of recently frequently accessed websites according to a preconfigured filtering condition and puts the group of websites into the set L. If the user specifies the set D or there are not enough website address records in the terminal, all elements in D are put into the set L. A subset V whose size is c is selected from the set L and is used as website information that needs to be identified by the user in this authentication. If a size of L is smaller than c, all website addresses may be put into the set L.

The set L constructed in this case is the set of the first-type website information.

440. Determine first-type website information that is involved in authentication and an interfering item that is in second-type website information and is involved in authentication.

In this embodiment of the present invention, an interfering item refers to website information of a website that the user has accessed before but has not accessed recently.

The authentication apparatus selects, according to configuration information, a subset R whose size is i from the list List, where it is required that all elements in R are not in L; and then selects a subset V whose size is c from the set L, and uses the subset V as first-type website information that needs to be identified by the user in this authentication. If L includes website information records of all accessed websites in the terminal, R is empty and there is no interfering item, and in this case, a solution is simplified to require that the user identifies, from a set including fake website information, website information of an accessed website that really exists in the terminal.

In addition, to reduce a memory difficulty, a quantity of elements in V may be further increased, that is, a quantity of elements in V may be more than c.

450. Determine a confounding item in the second-type website information.

In this embodiment of the present invention, a confounding item refers to website information that is randomly generated by the system, or website information of a website that the terminal has never accessed.

The authentication apparatus generates a group of fake website information, where a quantity of pieces of fake website information is f and the group is denoted as a set F. The fake website information may be formed by performing filtering according to website information initially configured in the system; or may be acquired by performing retrieving by connecting a remote network service. An element in the set F cannot appear in the set L or D.

The confounding item may not be generated either, and in this case, f is 0 and the set F is an empty set.

460. Generate an authentication challenge set.

The authentication apparatus disorganizes elements in the sets V, R, and F, to form an authentication challenge set A, that is, A=V+R+F (where a symbol "+" represents adding the sets).

470. Present the authentication challenge set and confirm an authentication result.

The authentication apparatus presents the authentication challenge set A to the user, so that the user performs identification.

The authentication apparatus may determine the authentication result according to an authentication identification result of the user. If the user can select c elements in V from the authentication challenge set A, authentication succeeds; otherwise, authentication fails.

In this embodiment of the present invention, at the time of calculating the first-type website information, weighted calculation may be performed according to time duration from a time when an access behavior is generated to a current time, or the user may also directly specify a group of fixed website information as the first-type website information, which, in this case, equals to that this group of fixed entities are endowed with a largest weight. By introducing the fake website information set F in a process of constructing a set A that is finally displayed on a screen, a size of selection space is increased, which plays a confounding function, so as to improve a degree of differentiation on the user; in addition, information in the sets R and V may be further protected. A purpose of introducing the set R in this method is to further improve a selection difficulty and avoid an attacker who knows website information existing in the terminal from directly obtaining, by means of a guess, the first-type website information.

As shown in FIG. 4, the method in this embodiment of the present invention can support multiple operating modes. When operation is performed for the first time upon startup or when authentication parameter configuration changes, an initial authentication mode needs to be executed. In the initial authentication mode, the foregoing steps 410 to 470 need to be performed. As shown by a direction of an arrow 472 in FIG. 4, after authentication ends, if the authentication parameter configuration changes, the initial authentication mode directly starts from step 410, so as to perform steps 410 to 470. After the user generates a new website access behavior, in this case, a website that the user frequently accesses recently may have already changed, and the authentication apparatus needs to execute an access authentication mode. In a theoretical situation, the authentication apparatus may execute the access authentication mode in any step before step 470 and after step 430. However, in an actual situation, generally, no interaction behavior except authentication is generated in the authentication process, and another interaction behavior is possibly generated only after the authentication ends. As shown by a direction of an arrow 473 in FIG. 4, in this case, the access authentication mode starts from step 430, so as to perform steps 430 to 470. Reselection authentication is used mainly when the user expects that a strongest anti-peeping capability is provided or when a quantity of user authentication error times is excessively large, which requires that a subset V recalculated each time is different under a premise that the set L remains unchanged, and reselection may be performed $C_{|L|}^{|V|}$ (combination calculation) times at most. Similar to the access authentication mode, a reselection authentication mode needs to be executed after last authentication is completed. As shown by a direction of an arrow 474 in FIG. 4, in this case, the reselection authentication mode starts from step 440, and steps 440 to 470 need to be performed in the reselection authentication mode. In an unchanged authentication mode, the set A remains totally unchanged, and authentication is performed on the user based on a same secret and same interference information. As shown by a direction of an arrow 471 in FIG. 4, in this case, in the unchanged authentication mode, only step 470 needs to be performed again.

In the unchanged authentication mode, if there is an error of current user authentication, next authentication is still performed based on same interference and a same secret. By means of step-by-step trials and errors, a quantity of combinations of excluded website information gradually increases, and a possibility that an attacker makes a correct guess increases, but a descending speed is extremely slow. For example, it is assumed that the set A includes 24 elements and it is required to identify three pieces of the first-type website information (a size of the set V is three) at the time of authentication, a probability that the attacker makes a correct guess at the beginning is 1/2024 (a quantity of combinations of three accessed websites is 24*23*22/6=2024). After the attacker tries m times, a probability of making a correct guess changes to 1/2014-m. Therefore, it can be learned that, with a common parameter size, this solution resists a guess attack for thousands of times. In a situation with consecutive authentication errors of the user, authentication is performed after being delayed for a period of time (such as 30 seconds), and this solution can resist the guess attack for a long time. To further improve an anti-guessing capability, after authentication errors occur consecutively for specific times, the system performs reselection authentication once, and can recalculate the challenge set A and then reenter the unchanged authentication mode.

In various existing authentication solutions, for example, a password, because a secret is fixed, once the secret is peeped at during authentication, an attacker can grasp all authentication secrets and completely break through an authentication mechanism. An authentication secret in this solution is based on the first-type website information, which is information changing dynamically and constantly. It is assumed that the attacker obtains, by means of a peep, a secret (a group of the first-type website information at that time) of last authentication of the user and is in a condition of being capable of getting a terminal of the user, the attacker may try to perform authentication based on the previously obtained secret. In many situations, an actual user of the terminal has already generated several new access behaviors, and in this case, the first-type website information has already changed, then the previous authentication secret is invalid. This solution has a complete anti-peeping capability. In few situations, even if the user does not generate any new access behavior, if the user is particularly concerned with anti-peeping, the system may be set to perform reselection authentication each time, so that authentication is performed on the user based on a different secret each time, and by combining an authentication error delay, a better anti-peeping capability can be provided. For example, the user has eight pieces of the first-type website information that match a condition (|L|=8), and if it is required that three pieces of the first-type website information (|v|=3) are selected each time, before reselection authentication is performed 56 times, a secret for each authentication is different.

Figure 5:
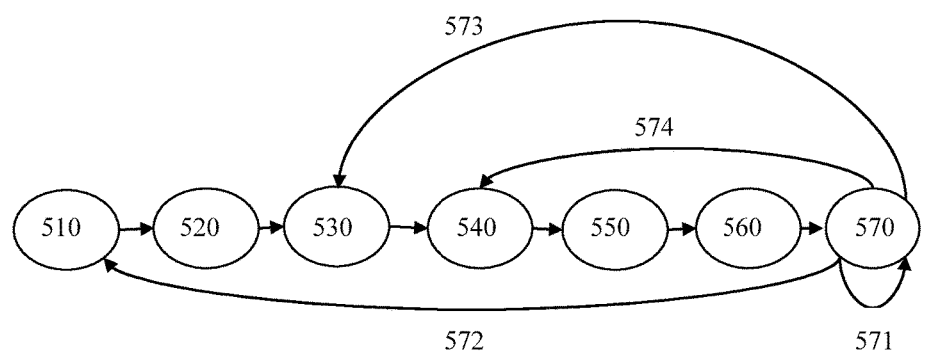
FIG. 5 is a schematic flowchart of performing user authentication using information about a read ebook according to an embodiment of the present invention.

FIG. 5 is a schematic flowchart of performing user authentication using information about a read ebook according to an embodiment of the present invention. In this embodiment of the present invention, authentication information is specific attribute information of a read ebook, such as a book name of the ebook, an author of the ebook, a cover of the ebook, or a combination of the book name and the cover of the ebook. In this embodiment of the present invention, identity verification is implemented by making a user recall and identify an ebook that the user frequently reads recently. For ease of description, ebook information mentioned below refers to specific attribute information of an ebook.

As shown in FIG. 5, detailed steps of an initial authentication process in this embodiment of the present invention are specifically as follows.

510. Configure an authentication parameter.

A user may configure a working manner of an authentication apparatus, and a configured parameter may be saved in a configuration database of the authentication apparatus.

The user may perform the following configurations.

(1) excluded ebook information (which may be denoted as NP). Ebook information specified in this part is not involved in a process of generating authentication information, so that the user is allowed to directly exclude some ebook information that the user considers sensitive. In other words, an element in a set NP does not appear in first-type ebook information. To avoid confusion, the element in the set NP does not appear in second-type ebook information either.

(2) a parameter of a first-type ebook information selection method, which may include a valid time requirement (denoted as T, for example, three days, five days, or 10 hours) on reading of an ebook, and an occurrence frequency requirement (denoted as X, representing a preset quantity of times, for example, five times, or representing preset ranking, for example, the top three, or representing a preset percentage, for example, 3%) on information about a read ebook. First-type ebook information determined based on T and X may be denoted as L. The user may not perform configuration either. The parameter of the first-type ebook information selection method may be set to a default setting for the authentication apparatus. In addition, the user may also specify one or multiple read ebooks as fixed first-type ebook information, instead of obtaining the first-type ebook information by temporarily calculating the foregoing T and X. The first-type ebook information specified by the user may be denoted as D.

(3) a parameter of second-type ebook information, which may include a quantity (denoted as f) of confounding items at the time of constructing authentication information and/or a quantity (denoted as i) of interfering items at the time of constructing authentication information. A confounding item refers to fake ebook information that is randomly generated by a system or information about an ebook that does not exist in the terminal, and an interfering item refers to information about an ebook that the user has not read recently.

(4) an authentication selection parameter, which may include a quantity (denoted as c, for example, authentication succeeds only when three pieces of the first-type ebook information are correctly selected at the same time) of pieces of the first-type ebook information that needs to be correctly selected at the same time during authentication each time. A security strength adjustment function may be further introduced into the authentication apparatus, and security strength of identity authentication may be adjusted by adjusting values of the foregoing f, i, and c. Obviously, when these three values are larger, the security strength is higher. The authentication apparatus may set different difficulty levels, where each level corresponds to a different value, which may be implemented using a security strength drag bar or a difficulty selection box; or the authentication apparatus may provide a value adjustment function, to separately adjust the foregoing three values.

After the configuration is completed, the authentication apparatus automatically loads a corresponding configuration parameter when authentication starts.

520. Read an ebook reading record of a terminal.

The authentication apparatus may read, using a functional module similar to an ebook monitoring module, a record (denoted as L1) of all ebooks stored in the terminal and an ebook opening record of the user (denoted as L2). If an ebook monitoring switch is on, create, open, and close behaviors of files of these types are tracked according to main ebook types (for example, portable document format (PDF)), and L1 and L2 are updated according to these behaviors. For an ebook in the set NP or the set D, monitoring may not be performed.

530. Determine a set of first-type ebook information.

If the user specifies the set D or there are not enough ebook opening records in the terminal, the authentication apparatus may put an element in D into the set L; otherwise, the authentication apparatus may acquire L2 and L1, calculates a reading frequency of each ebook according to L2 and with reference to weight configuration, selects a group of ebooks with a highest frequency, and puts the group into the set L.

The set L constructed in this case is the set of the first-type ebook information.

540. Determine first-type ebook information that is involved in authentication and an interfering item in second-type ebook information and is involved in authentication.

In this embodiment of the present invention, an interfering item refers to an ebook that the user has not read recently.

The authentication apparatus selects a subset R from L1, where it is required that all elements in R do not appear in the sets L2 and L; and selects a subset V whose size is c from the set L, and uses the subset V as first-type ebook information that needs to be identified by the user in this authentication. If L includes information about all ebooks in the system, R is empty, and in this case, a solution is simplified to require that the user identifies, from all ebooks including fake information, information about an ebook that really exists in the terminal.

In addition, to reduce a memory difficulty, a quantity of elements in V may be further increased, that is, a quantity of elements in V may be more than c.

550. Determine a confounding item in the second-type ebook information.

In this embodiment of the present invention, a confounding item refers to an ebook that is randomly generated by the system, or an ebook that does not exist in the terminal.

The authentication apparatus generates a group of fake ebooks, where a quantity of fake ebooks is f and the group is denoted as a set F. The fake read ebook may be formed by performing filtering according to an ebook library initially configured in the system; or may be acquired by performing retrieving by connecting a remote network service. An element in the set F cannot appear in the set L or D.

The confounding item may not be generated either, and in this case, f is 0 and the set F is an empty set.

560. Generate an authentication challenge set.

The authentication apparatus disorganizes elements in the sets V, R, and F, to form an authentication challenge set A, that is, A=V+R+F (where a symbol "+" represents adding the sets).

570. Present the authentication challenge set and confirm an authentication result.

The authentication apparatus presents the authentication challenge set A to the user, so that the user performs identification.

The authentication apparatus may determine the authentication result according to an authentication identification result of the user. If the user can select c elements in V from the authentication challenge set A, authentication succeeds; otherwise, authentication fails.

In this embodiment of the present invention, at the time of calculating the first-type ebook information, weighted calculation may be performed according to time duration from a time when a reading behavior is generated to a current time, or the user may also directly specify a group of fixed ebook information as the first-type ebook information, which, in this case, equals to that this group of fixed entities are endowed with a largest weight. By introducing the fake ebook information set F in a process of constructing a set A that is finally displayed on a screen, a size of selection space is increased, which plays a confounding function, so as to improve a degree of differentiation on the user; in addition, information in the sets R and V may be further protected. A purpose of introducing the set R in this method is to further improve a selection difficulty and avoid an attacker who knows ebook information existing in the terminal from directly obtaining, by means of a guess, the first-type ebook information.

As shown in FIG. 5, the method in this embodiment of the present invention can support multiple operating modes. When operation is performed for the first time upon startup or when authentication parameter configuration changes, an initial authentication mode needs to be executed. In the initial authentication mode, the foregoing steps 510 to 570 need to be performed. As shown by a direction of an arrow 572 in FIG. 5, after authentication ends, if the authentication parameter configuration changes, the initial authentication mode directly starts from step 510, so as to perform steps 510 to 570. After the user generates a new ebook reading behavior, in this case, the first-type ebook information of the user may have already changed, and the authentication apparatus needs to execute a reading authentication mode. In a theoretical situation, the authentication apparatus may execute the reading authentication mode in any step before step 570 and after step 530. However, in an actual situation, generally, no interaction behavior except authentication is generated in the authentication process, and another interaction behavior is possibly generated only after the authentication ends. As shown by a direction of an arrow 573 in FIG. 5, in this case, the reading authentication mode starts from step 530, so as to perform steps 530 to 570. Reselection authentication is used mainly when the user expects that a strongest anti-peeping capability is provided or when a quantity of user authentication error times is excessively large, which requires that a subset V recalculated each time is different under a premise that the set L remains unchanged, and reselection may be performed $C_{|L|}^{|V|}$ (combination calculation) times at most. Similar to the reading authentication mode, a reselection authentication mode needs to be executed after last authentication is completed. As shown by a direction of an arrow 574 in FIG. 5, in this case, the reselection authentication mode starts from step 540, and steps 540 to 570 need to be performed in the reselection authentication mode. In an unchanged authentication mode, the set A remains totally unchanged, and authentication is performed on the user based on a same secret and same interference information. As shown by a direction of an arrow 571 in FIG. 5, in this case, in the unchanged authentication mode, only step 570 needs to be performed again.

In the unchanged authentication mode, if there is an error of current user authentication, next authentication is still performed based on same interference and a same secret. By means of step-by-step trials and errors, a quantity of combinations of excluded ebook information gradually increases, and a possibility that an attacker makes a correct guess increases, but a descending speed is extremely slow. For example, it is assumed that the set A includes 24 elements and it is required to identify three pieces of the first-type ebook information (a size of the set V is three) at the time of authentication, a probability that the attacker makes a correct guess at the beginning is 1/2024 (a quantity of combinations of three read ebooks is 24*23*22/6=2024). After the attacker tries m times, a probability of making a correct guess changes to 1/2014-m. Therefore, it can be learned that, with a common parameter size, this solution resists a guess attack for thousands of times. In a situation with consecutive authentication errors of the user, authentication is performed after being delayed for a period of time (such as 30 seconds), and this solution can resist the guess attack for a long time. To further improve an anti-guessing capability, after authentication errors occur consecutively for specific times, the system performs reselection authentication once, and can recalculate the challenge set A and then reenter the unchanged authentication mode.

In various existing authentication solutions, for example, a password, because a secret is fixed, once the secret is peeped at during authentication, an attacker can grasp all authentication secrets and completely break through an authentication mechanism. An authentication secret in this solution is based on the first-type ebook information, which is information changing dynamically and constantly. It is assumed that the attacker obtains, by means of a peep, a secret (a group of the first-type ebook information at that time) of last authentication of the user and is in a condition of being capable of getting a terminal of the user, the attacker may try to perform authentication based on the previously obtained secret. In many situations, an actual user of the terminal has already generated several new reading behaviors, and in this case, the first-type ebook information has already changed, then the previous authentication secret is invalid. This solution has a complete anti-peeping capability. In few situations, even if the user does not generate any new reading behavior, if the user is particularly concerned with anti-peeping, the system may be set to perform reselection authentication each time, so that authentication is performed on the user based on a different secret each time, and by combining an authentication error delay, a better anti-peeping capability can be provided. For example, the user has eight pieces of the first-type ebook information that match a condition (|L|=8), and if it is required that three pieces of the first-type ebook information (|v|=3) are selected each time, before reselection authentication is performed 56 times, a secret for each authentication is different.

Figure 6:
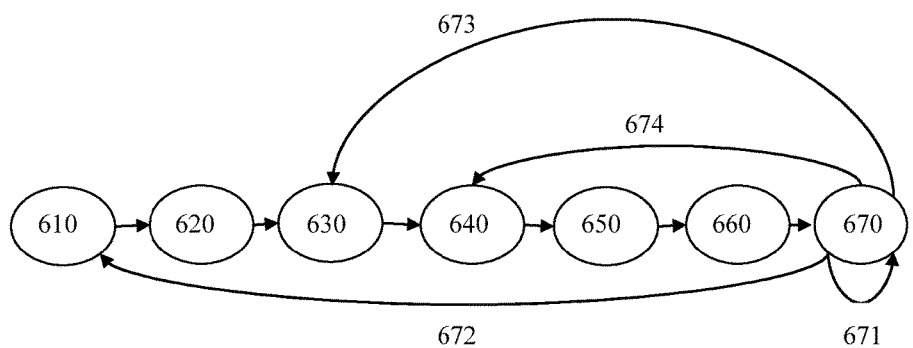
FIG. 6 is a schematic flowchart of performing user authentication using a used application according to an embodiment of the present invention.

FIG. 6 is a schematic flowchart of performing user authentication using information about a used application (APP) according to an embodiment of the present invention. In this embodiment of the present invention, authentication information is specific attribute information of a used APP, such as a name of the APP, a developer company of the APP, an application icon of the APP, or a combination of the name and the icon of the APP. In this embodiment of the present invention, identity verification is implemented by making a user recall and identify an APP that he/she frequently uses recently. For ease of description, APP information mentioned below refers to specific attribute information of an APP.

As shown in FIG. 6, detailed steps of an initial authentication process in this embodiment of the present invention are specifically as follows.

610. Configure an authentication parameter.

A user may configure a working manner of an authentication apparatus, and a configured parameter may be saved in a configuration database of the authentication apparatus.

The user may perform the following configurations.

(1) excluded APP information (which may be denoted as NP). APP information specified in this part is not involved in a process of generating authentication information, so that the user is allowed to directly exclude some well-known APP information or APP information that the user feels extremely sensitive. In other words, an element in a set NP does not appear in first-type APP information. To avoid confusion, the element in the set NP does not appear in second-type APP information either.

(2) a parameter of a first-type APP information selection method, which may include a valid time requirement (denoted as T, for example, three days, five days, or 10 hours) on use of an APP, and an occurrence frequency requirement (denoted as X, representing a preset quantity of times, for example, five times, or representing preset ranking, for example, the top three, or representing a preset percentage, for example, 3%) on use of the APP. First-type APP information determined based on T and X may be denoted as L. The user may not perform configuration either. The parameter of the first-type APP information selection method may be set to a default setting for the authentication apparatus. In addition, the user may also specify one or multiple pieces of APP information as fixed first-type APP information, instead of obtaining the first-type APP information by temporarily calculating the foregoing T and X. The first-type APP information specified by the user may be denoted as D.

(3) a parameter of second-type APP information, which may include a quantity (denoted as f) of confounding items at the time of constructing authentication information and/or a quantity (denoted as i) of interfering items at the time of constructing authentication information. A confounding item refers to fake APP information that is randomly generated by a system or information about an APP that does not exist in the terminal, and an interfering item refers to information about an APP that the user has not used recently.

(4) an authentication selection parameter, which may include a quantity (denoted as c, for example, authentication succeeds only when three pieces of the first-type APP information are correctly selected at the same time) of pieces of the first-type APP information that needs to be correctly selected at the same time during authentication each time. A security strength adjustment function may be further introduced into the authentication apparatus, and security strength of identity authentication may be adjusted by adjusting values of the foregoing f, i, and c. Obviously, when these three values are larger, the security strength is higher. The authentication apparatus may set different difficulty levels, where each level corresponds to a different value, which may be implemented using a security strength drag bar or a difficulty selection box; or the authentication apparatus may provide a value adjustment function, to separately adjust the foregoing three values.

After the configuration is completed, the authentication apparatus automatically loads a corresponding configuration parameter when authentication starts.

620. Read an APP installation and use behavior record of a terminal.

The authentication apparatus may include an APP use tracking module that is used to read an APP installation and use behavior record. The authentication apparatus may read the APP installation and use behavior record (denoted as H) using the APP use tracking module. If an APP tracking switch is on, tracking on an APP installation and use behavior of the system starts, and H is updated. An installation and opening behavior of an APP in the set NP or the set D may not be recorded.

630. Acquire a set of first-type APP information.

If the user specifies to use the set D or there are not enough APP use records in a user terminal, an authentication information calculating module directly puts an element in D into L; otherwise, the set H is acquired, and a use frequency of each APP is calculated with reference to a weight parameter and ranked, and a group of APPs whose frequency meets a requirement are selected and put into the set L.

The set L constructed in this case is the set of the first-type APP information.

640. Acquire first-type APP information that is involved in authentication and an interfering item that is in second-type APP information and is involved in authentication.

In this embodiment of the present invention, an interfering item refers to information about an APP that the user has not used recently.

The authentication apparatus queries and acquires a group of installed APPs and puts the group of installed APPs into the set R, where it is required that an APP in R has not been used by the user recently and does not appear in L; and then selects a subset V whose size is c from the set L, and uses the subset V as first-type APP information that needs to be identified by the user in this authentication. If L includes information about all contacts in an address book of the system, R is empty, and in this case, a solution is simplified to require that the user identifies, from an APP set that is mixed with the confounding item, information about an APP that really exists in the terminal.

In addition, to reduce a memory difficulty, a quantity of elements in V may be further increased, that is, a quantity of elements in V may be more than c.

650. Determine a confounding item in the second-type APP information.

In this embodiment of the present invention, a confounding item refers to APP information that is randomly generated by the system, or information about an APP that does not exist in the terminal.

The authentication apparatus generates a group of fake APP information, where a quantity of pieces of fake APP information is f and the group is denoted as a set F. The fake APP information may be acquired according to a fake APP database initially configured in the system; or may be acquired by connecting a remote network service. An element in the set F cannot appear in the set L or D.

The confounding item may not be generated either, and in this case, f is 0 and the set F is an empty set.

660. Generate an authentication challenge set.

The authentication apparatus disorganizes elements in the sets V, R, and F, to form an authentication challenge set A, that is, A=V+R+F (where a symbol "+" represents adding the sets).

670. Present the authentication challenge set and confirm an authentication result.

The authentication apparatus presents the authentication challenge set A to the user, so that the user performs identification.

The authentication apparatus may determine the authentication result according to an authentication identification result of the user. If the user can select c elements in V from the authentication challenge set A, authentication succeeds; otherwise, authentication fails.

In this embodiment of the present invention, at the time of calculating the first-type APP information, weighted calculation may be performed according to time duration from a time when a use behavior is generated to a current time, or the user may also directly specify a group of fixed APP information as the first-type APP information, which, in this case, equals to that this group of fixed entities are endowed with a largest weight. By introducing the fake APP information set F in a process of constructing a set A that is finally displayed on a screen, a size of selection space is increased, which plays a confounding function, so as to improve a degree of differentiation on the user; in addition, information in the sets R and V may be further protected. A purpose of introducing the set R in this method is to further improve a selection difficulty and avoid an attacker who knows a used APP that exists in the terminal from directly obtaining, by means of a guess, the first-type APP information.

As shown in FIG. 6, the method in this embodiment of the present invention can support multiple operating modes. When operation is performed for the first time upon startup or when authentication parameter configuration changes, an initial authentication mode needs to be executed. In the initial authentication mode, the foregoing steps 610 to 670 need to be performed. As shown by a direction of an arrow 672 in FIG. 6, after authentication ends, if the authentication parameter configuration changes, the initial authentication mode directly starts from step 610, so as to perform steps 610 to 670. After the user creates a new APP use behavior, in this case, the first-type APP information of the user may have already changed, and the authentication apparatus needs to execute a use authentication mode. In a theoretical situation, the authentication apparatus may execute the use authentication mode in any step before step 670 and after step 630. However, in an actual situation, generally, no interaction behavior except authentication is generated in the authentication process, and another interaction behavior is possibly generated only after the authentication ends. As shown by a direction of an arrow 673 in FIG. 6, in this case, the use authentication mode starts from step 630, so as to perform steps 630 to 670. Reselection authentication is used mainly when the user expects that a strongest anti-peeping capability is provided or when a quantity of user authentication error times is excessively large, which requires that a subset V recalculated each time is different under a premise that the set L remains unchanged, and reselection may be performed $C_{|L|}^{|V|}$ (combination calculation) times at most. Similar to the use authentication mode, a reselection authentication mode needs to be executed after last authentication is completed. As shown by a direction of an arrow 674 in FIG. 6, in this case, the reselection authentication mode starts from step 640, and steps 640 to 670 need to be performed in the reselection authentication mode. In an unchanged authentication mode, the set A remains totally unchanged, and authentication is performed on the user based on a same secret and same interference information. As shown by a direction of an arrow 671 in FIG. 6, in this case, in the unchanged authentication mode, only step 670 needs to be performed again.

In the unchanged authentication mode, if there is an error of current user authentication, next authentication is still performed based on same interference and a same secret. By means of step-by-step trials and errors, a quantity of combinations of excluded used APPs gradually increases, and a possibility that an attacker makes a correct guess increases, but a descending speed is extremely slow. For example, it is assumed that the set A includes 24 elements and it is required to identify three pieces of the first-type APP information (a size of the set V is three) at the time of authentication, a probability that the attacker makes a correct guess at the beginning is 1/2024 (a quantity of combinations of three used APPs is 24*23*22/6=2024). After the attacker tries m times, a probability of making a correct guess changes to 1/2014-m. Therefore, it can be learned that, with a common parameter size, this solution resists a guess attack for thousands of times. In a situation with consecutive authentication errors of the user, authentication is performed after being delayed for a period of time (such as 30 seconds), and this solution can resist the guess attack for a long time. To further improve an anti-guessing capability, after authentication errors occur consecutively for specific times, the system performs reselection authentication once, and can recalculate the challenge set A and then reenter the unchanged authentication mode.

In various existing authentication solutions, for example, a password, because a secret is fixed, once the secret is peeped at during authentication, an attacker can grasp all authentication secrets and completely break through an authentication mechanism. An authentication secret in this solution is based on the first-type APP information, which is information changing dynamically and constantly. It is assumed that the attacker obtains, by means of a peep, a secret (a group of the first-type APP information at that time) of last authentication of the user and is in a condition of being capable of getting a terminal of the user, the attacker may try to perform authentication based on the previously obtained secret. In many situations, an actual user of the terminal has already generated several new use behaviors, and in this case, the first-type APP information has already changed, then the previous authentication secret is invalid. This solution has a complete anti-peeping capability. In few situations, even if the user does not generate any new use behavior, if the user is particularly concerned with anti-peeping, the system may be set to perform reselection authentication each time, so that authentication is performed on the user based on a different secret each time, and by combining an authentication error delay, a better anti-peeping capability can be provided. For example, the user has eight pieces of the first-type APP information that match a condition (|L|=8), and if it is required that three pieces of the first-type APP information (|v|=3) are selected each time, before reselection authentication is performed 56 times, a secret for each authentication is different.

In the foregoing several embodiments, merely several types of interaction object information that can be used for identity authentication are introduced, such as contact information, information about a used APP, information about an identifier or performer of a musical work, information about an accessed website, and information about a read ebook. In the method in this embodiment of the present invention, multiple types of authentication information may also be used, for example, information about a director or name of a video file, or information about a geographical area that a terminal has been to (obtained using a record of a location, in a mobile network, of a terminal user on the terminal), or information about a picture browsed inside a terminal. For a specific implementation method, reference may be made to the foregoing embodiments.

Figure 7:
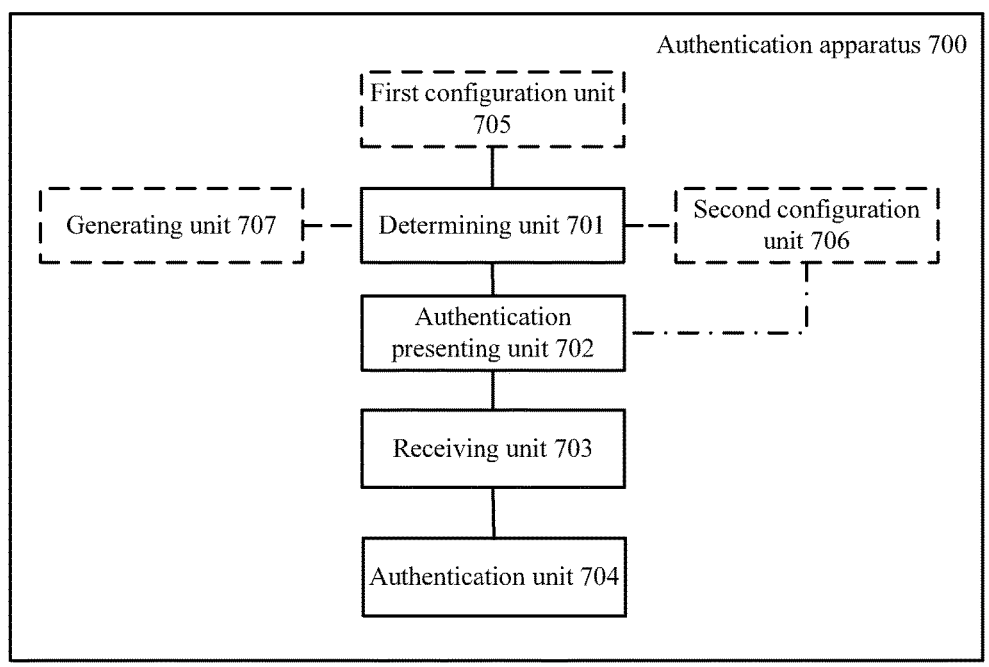
FIG. 7 is a schematic structural diagram of an authentication apparatus according to an embodiment of the present invention.

FIG. 7 is a schematic structural diagram of an authentication apparatus 700 according to an embodiment of the present invention. The authentication apparatus 700 may include a determining unit 701, an authentication presenting unit 702, a receiving unit 703, and an authentication unit 704.

The determining unit 701 is configured to determine first-type authentication information and second-type authentication information that are of a terminal in which the authentication apparatus 700 is located.

The first-type authentication information includes specific attribute information that is in specific attribute information of an interaction object corresponding to a specific interaction behavior of the terminal and whose occurrence frequency within preset time falls in a preset range, the specific attribute information is one type of attribute information of the interaction object or a combination of multiple types of the attribute information of the interaction object, and the second-type authentication information is used to interfere with selection, by a user of the terminal, of the first-type authentication information.

It should be understood that the specific interaction behavior refers to an interaction behavior used to determine an occurrence frequency in an authentication process. The interaction object corresponding to the specific interaction behavior refers to a source for collecting the first-type authentication information, and the specific attribute information of the interaction object may be used to construct the first-type authentication information.

It should be understood that the specific attribute information is one type of attribute information of the interaction object or a combination of multiple types of the attribute information of the interaction object, or may be a unique identifier, a name, a picture, a name plus a picture, or the like.

It should be understood that specific attribute information of different interaction objects may be the same. For example, audio files in a same album have a same album name. For another example, authors of several different ebooks may be a same author, and the like. When the first-type authentication information is confirmed, the first-type authentication information is determined using an occurrence frequency of the specific attribute information of the interaction object corresponding to the specific interaction behavior.

It should be understood that the second-type authentication information may include at least one of the following: specific attribute information that is in the specific attribute information of the interaction object corresponding to the specific interaction behavior of the terminal and whose occurrence frequency within the preset time falls outside the preset range; and specific attribute information that does not belong to the specific attribute information of the interaction object corresponding to the specific interaction behavior of the terminal.

Optionally, the specific interaction behavior of the terminal is an interaction behavior specified in the authentication process. The specific interaction behavior of the terminal may have multiple forms of expression, and accordingly, the first-type authentication information and the second-type authentication information may also have multiple forms of expression. For example, the specific interaction behavior of the terminal may include a behavior that the terminal accesses a contact in the terminal, and the first-type authentication information and the second-type authentication information are specific attribute information of the contact; or the specific interaction behavior of the terminal may include a behavior that the terminal accesses an audio and video file in the terminal, and the first-type authentication information and the second-type authentication information are specific attribute information of the audio and video file; or the specific interaction behavior of the terminal may include a behavior that the terminal accesses an application in the terminal, and the first-type authentication information and the second-type authentication information are specific attribute information of the application; or the specific interaction behavior of the terminal may include a behavior that the terminal accesses a website, and the first-type authentication information and the second-type authentication information are specific attribute information of the website; or the specific interaction behavior of the terminal may include a behavior that the terminal accesses a picture in the terminal, and the first-type authentication information and the second-type authentication information are specific attribute information of the picture; or the specific interaction behavior of the terminal may include a behavior that the terminal accesses an ebook in the terminal, and the first-type authentication information and the second-type authentication information are specific attribute information of the ebook; or the specific interaction behavior of the terminal may include a behavior that the terminal communicates with a device outside the terminal, and the first-type authentication information and the second-type authentication information are information about a geographical area in which the terminal is located when the terminal communicates with the device outside the terminal. In a specific implementation manner of this embodiment of the present invention, when the first-type authentication information is the specific attribute information of the contact, information about the contact may be a photo of the contact, a name of the contact, a phone number of the contact, a name plus a picture of the contact, or the like. In another specific implementation manner of this embodiment of the present invention, when the first-type authentication information is information about an audio file, the information about the audio file may be a name of the audio file, an album name of the audio file, a performer of the audio file, or the like.

Optionally, the terminal may have multiple specific implementation forms, such as a smartphone, a tablet computer, a personal computer, a server, or a workstation. The terminal may also be another device that has an authentication function, which is not limited in this embodiment of the present invention herein.

It should be understood that the first-type authentication information includes the specific attribute information that is in the specific attribute information of the interaction object corresponding to the specific interaction behavior of the terminal and whose occurrence frequency within the preset time falls in the preset range, where the occurrence frequency falls in the preset range, and this range may be an absolute frequency range, or may be a relative frequency range. For example, the preset range is a range in which a quantity of occurrence times of the specific attribute information of the interaction object corresponding to the specific interaction behavior of the terminal within the preset time exceeds a preset quantity of occurrence times, or a range in which a quantity of occurrence times of the specific attribute information of the interaction object corresponding to the specific interaction behavior of the terminal within the preset time exceeds a preset percentage of a total quantity of occurrence times, or a range in which ranking of a quantity of occurrence times of the specific attribute information of the interaction object corresponding to the specific interaction behavior of the terminal within the preset time falls within preset ranking, or a range in which ranking of a quantity of occurrence times of the specific attribute information of the interaction object corresponding to the specific interaction behavior of the terminal within the preset time falls within a preset percentage. For example, the first-type authentication information may be a name of a contact whose quantity of talk times within three days exceeds five times, or a name of an ebook whose quantity of ebook reading times within two days exceeds 10% of a total quantity of reading times within two days, or a music album whose playing ranking within five days is on the top three, or a website whose website access frequency within 12 hours is in the first 5%, or the like.

It should be understood that both the preset time and the preset range are configurable. For example, the preset time may be configured as 12 hours, one day, two days, three days, or even one month, or the like, which is not limited in this embodiment of the present invention. For another example, the preset range may be configured as more than one time, more than five times, or first five or first 5% of all occurrence frequencies, or the like.

Optionally, the first-type authentication information further includes specific attribute information of an interaction object specified in the terminal by the user of the terminal, so as to reduce a memory price of memorizing the first-type authentication information by the user of the terminal.

The authentication presenting unit 702 is configured to present a first authentication challenge set to the user of the terminal.

The first authentication challenge set includes at least one piece of the first-type authentication information and at least one piece of the second-type authentication information.

The receiving unit 703 is configured to receive an identification result obtained by identifying, by the user of the terminal, the first-type authentication information and the second-type authentication information that are in the first authentication challenge set.

The authentication unit 704 is configured to determine an authentication result according to an identification correctness rate of the first-type authentication information in the identification result.

In this embodiment of the present invention, the authentication apparatus 700 dynamically generates authentication information using specific attribute information of an interaction object that is in the terminal and whose occurrence frequency within a preset time is preset, to perform authentication on a user. Because information about a recently most frequently used specific interaction object belongs to information within a memory period of the user, a memory price of the user can be reduced, and authentication information that appears each time is not fixed, which can avoid the authentication information from being stolen due to a peep, resulted from incaution, at the authentication information. Therefore, the authentication apparatus 700 reduces the memory price of memorizing the authentication information by the user, and also has a certain anti-peeping capability at the same time.

In addition, because the authentication apparatus 700 can dynamically generate the authentication information based on an access frequency, to perform authentication on the user, using experience of the user can further be improved.

Optionally, before the receiving unit 703 receives the identification result obtained by identifying, by the user of the terminal, the first-type authentication information and the second-type authentication information that are in the first authentication challenge set, if the interaction object corresponding to the specific interaction behavior of the terminal changes, or the terminal generates a new specific interaction behavior, the determining unit 701 is further configured to redetermine the first-type authentication information and the second-type authentication information that are of the terminal, so that the authentication presenting unit 702 presents a second authentication challenge set to the user of the terminal, where the second authentication challenge set is generated based on the first-type authentication information and the second-type authentication information that are redetermined by the determining unit 701. In a specific application, that the interaction object corresponding to the specific interaction behavior of the terminal changes may include: the interaction object corresponding to the specific interaction behavior of the terminal is added, or the interaction object corresponding to the specific interaction behavior of the terminal is deleted, or the interaction object corresponding to the specific interaction behavior of the terminal is modified, or the like.

Optionally, the authentication apparatus 700 may further include a first configuration unit 705. The first configuration unit 705 is configured to configure the preset time, the preset range, and a quantity N of pieces of the first-type authentication information that needs to be identified for performing authentication on the user of the terminal. In this case, the authentication unit 704 is specifically configured to determine, when the quantity of pieces of the first-type authentication information that is identified by the user of the terminal and is in the identification result is not less than N, that the authentication on the user of the terminal succeeds; or determine, when the quantity of pieces of the first-type authentication information that is identified by the user of the terminal and is in the identification result is less than N, that the authentication on the user of the terminal fails.

The first configuration unit 705 may be configured to adjust security strength of the authentication on the user of the terminal by configuring the preset time, the preset range, and the quantity of pieces of the first-type authentication information that needs to be identified for performing authentication on the user of the terminal. If the preset time is longer and the preset range is larger, a set of the first-type authentication information is larger, and the security strength of the authentication on the user of the terminal is higher; if the quantity of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

Optionally, the authentication apparatus 700 may further include a second configuration unit 706. The second configuration unit 706 is configured to configure a set of excluded authentication information of the terminal, where authentication information in the set of excluded authentication information cannot be used as the first-type authentication information. In a process of determining at least one piece of the first-type authentication information of the terminal, the determining unit 701 is specifically configured to determine that specific attribute information that is in the specific attribute information of the interaction object corresponding to the specific interaction behavior of the terminal, whose occurrence frequency within the preset time falls in the preset range, and that does not belong to the set of excluded authentication information is the first-type authentication information.

Optionally, the authentication apparatus 700 may further include a generating unit 707. The generating unit 707 is configured to generate the authentication set according to the first-type authentication information and the second-type authentication information that are of the terminal, so as to present the authentication set to the user of the terminal.

In an actual application, in each component unit of the authentication apparatus, several units may be combined to one implementing module, or one unit may be implemented using several implementing modules together. For example, the determining unit 701 may include a monitoring and tracking module, an interaction object calculating module, and a fake interaction object generating module. The monitoring and tracking module is configured to monitor an interaction behavior between a user and an interaction object, the interaction object calculating module is configured to calculate a first-type interaction object and an interfering item in a second-type interaction object, and the fake interaction object generating module is configured to generate a confounding item in the second-type interaction object. The authentication presenting unit 702, the receiving unit 703, and the authentication unit 704 may be implemented by one authentication interacting module, or the authentication presenting unit 702 and the receiving unit 703 may be implemented by one input and output module, such as a touchscreen. The first configuration unit 705 and the second configuration unit 706 may be implemented by one configuring module. The authentication apparatus 700 may also have another specific implementation manner, which is not limited in this embodiment of the present invention herein.

In addition, the authentication apparatus 700 may further execute the method in FIG. 1 and implements a function, in the embodiments shown in FIG. 1 to FIG. 6, of the authentication apparatus 700. Reference may be made to the embodiments shown in FIG. 1 to FIG. 6. Details are not described herein again in the present invention.

Figure 8:
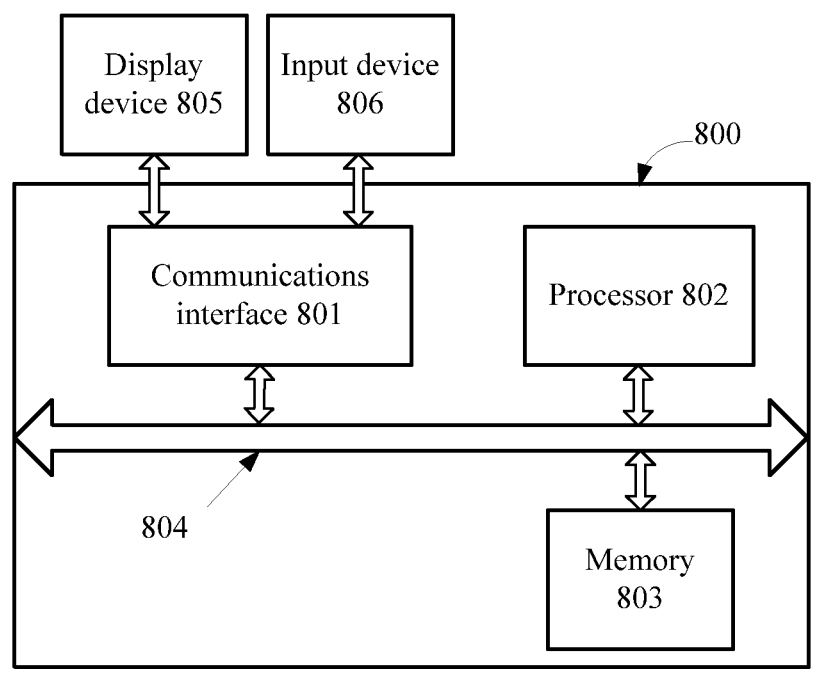
FIG. 8 is a schematic structural diagram of a terminal according to an embodiment of the present invention.

FIG. 8 is a schematic structural diagram of a terminal 800 according to an embodiment of the present invention. The terminal 800 may include a communications interface 801, a processor 802, and a memory 803.

The communications interface 801, the processor 802, and the memory 803 are interconnected using a bus 804 system. The bus 804 may be an Industry Standard Architecture (ISA) bus, a Peripheral Component Interconnect (PCI) bus, an Extended Industry Standard Architecture (EISA) bus, or the like. The bus 804 may be classified into an address bus, a data bus, a control bus, and the like. For ease of indication, only one double-headed arrow is used in FIG. 8 to represent the bus 804, which, however, does not mean that there is only one bus or only one type of bus.

The memory 803 is configured to store a program. The program may include program code, where the program code includes a computer operating instruction. The memory 803 may include a read-only memory and a random access memory, and provides an instruction and data for the processor 802. The memory 803 may include a high-speed random access memory (RAM) memory, and may also include a non-volatile memory, such as, at least one disk memory.

The processor 802 is configured to invoke the program stored in the memory 803 and is specifically configured to perform the following operations: determining at least one piece of first-type authentication information and at least one piece of second-type authentication information that are of the terminal 800, and presenting a first authentication challenge set on a display device 805 to a user of the terminal 800 using the communications interface 801, where the first-type authentication information includes specific attribute information that is in specific attribute information of an interaction object corresponding to a specific interaction behavior of the terminal 800 and whose occurrence frequency within a preset time falls in a preset range, the specific attribute information is one type of attribute information of the interaction object or a combination of multiple types of the attribute information of the interaction object, the second-type authentication information is used to interfere with selection, by the user of the terminal 800, of the first-type authentication information, and the first authentication challenge set includes the at least one piece of the first-type authentication information and the at least one piece of the second-type authentication information; and receiving, using the communications interface 801 and from an input device 806, an identification result obtained by identifying, by the user of the terminal 800, the first-type authentication information and the second-type authentication information that are in the first authentication challenge set, and determining an authentication result according to an identification correctness rate of the first-type authentication information in the identification result.

It should be understood that the specific interaction behavior refers to an interaction behavior used to determine an occurrence frequency in an authentication process. The interaction object corresponding to the specific interaction behavior refers to a source for collecting the first-type authentication information, and the specific attribute information of the interaction object may be used to construct the first-type authentication information.

The communications interface 801 is configured to implement data communication between the processor 802 and the display device 805, and between the processor 802 and the input device 806.

The display device 805 is configured to present the first authentication challenge set to the user of the terminal 800.

The input device 806 is configured to input the identification result obtained by identifying, by the user of the terminal 800, the first-type authentication information and the second-type authentication information that are in the first authentication challenge set.

It should be understood that the specific attribute information is one type of attribute information of the interaction object or a combination of multiple types of the attribute information of the interaction object, or may be a unique identifier, a name, a picture, a name plus a picture, or the like.

It should be understood that specific attribute information of different interaction objects may be the same. For example, audio files in a same album have a same album name. For another example, authors of several different ebooks may be a same author, and the like. When the first-type authentication information is confirmed, the first-type authentication information is determined using an occurrence frequency of the specific attribute information of the interaction object corresponding to the specific interaction behavior.

It should be understood that the second-type authentication information may include at least one of the following: specific attribute information that is in the specific attribute information of the interaction object corresponding to the specific interaction behavior of the terminal 800 and whose occurrence frequency within the preset time falls outside the preset range; and specific attribute information that does not belong to the specific attribute information of the interaction object corresponding to the specific interaction behavior of the terminal 800.

Optionally, the specific interaction behavior of the terminal is an interaction behavior specified by the terminal in the authentication process. The specific interaction behavior of the terminal may have multiple forms of expression, and accordingly, the first-type authentication information and the second-type authentication information may also have multiple forms of expression. For example, the specific interaction behavior of the terminal may include a behavior that the terminal accesses a contact in the terminal, and the first-type authentication information and the second-type authentication information are specific attribute information of the contact; or the specific interaction behavior of the terminal may include a behavior that the terminal accesses an audio and video file in the terminal, and the first-type authentication information and the second-type authentication information are specific attribute information of the audio and video file; or the specific interaction behavior of the terminal may include a behavior that the terminal accesses an application in the terminal, and the first-type authentication information and the second-type authentication information are specific attribute information of the application; or the specific interaction behavior of the terminal may include a behavior that the terminal accesses a website, and the first-type authentication information and the second-type authentication information are specific attribute information of the website; or the specific interaction behavior of the terminal may include a behavior that the terminal accesses a picture in the terminal, and the first-type authentication information and the second-type authentication information are specific attribute information of the picture; or the specific interaction behavior of the terminal may include a behavior that the terminal accesses an ebook in the terminal, and the first-type authentication information and the second-type authentication information are specific attribute information of the ebook; or the specific interaction behavior of the terminal may include a behavior that the terminal communicates with a device outside the terminal, and the first-type authentication information and the second-type authentication information are information about a geographical area in which the terminal is located when the terminal communicates with the device outside the terminal. In a specific implementation manner of this embodiment of the present invention, when the first-type authentication information is the specific attribute information of the contact, information about the contact may be a photo of the contact, a name of the contact, a phone number of the contact, a name plus a picture of the contact, or the like. In another specific implementation manner of this embodiment of the present invention, when the first-type authentication information is information about an audio file, the information about the audio file may be a name of the audio file, an album name of the audio file, a performer of the audio file, or the like.

Optionally, the terminal 800 may have multiple specific implementation forms, such as a smartphone, a tablet computer, a personal computer, a server, or a workstation. The terminal 800 may also be another device that has an authentication function, which is not limited in this embodiment of the present invention herein.

Optionally, the display device 805 and the input device 806 maybe combined to one device in the terminal 800, such as a touchscreen.

Optionally, the display device 805 and the input device 806 may be different devices in the terminal 800; the display device 805 is a display device, such as a display or a display screen, and the input device 806 is an input device, such as a mouse or a keyboard.

It should be understood that the first-type authentication information includes the specific attribute information that is in the specific attribute information of the interaction object corresponding to the specific interaction behavior of the terminal 800 and whose occurrence frequency within the preset time falls in the preset range, where the occurrence frequency falls in the preset range, and this range may be an absolute frequency range, or may be a relative frequency range. For example, the preset range is a range in which a quantity of occurrence times of the specific attribute information of the interaction object corresponding to the specific interaction behavior of the terminal 800 within the preset time exceeds a preset quantity of occurrence times, or a range in which ranking of a quantity of occurrence times of the specific attribute information of the interaction object corresponding to the specific interaction behavior of the terminal 800 within the preset time exceeds a preset percentage of a total quantity of occurrence times, or a range in which ranking of a quantity of occurrence times of the specific attribute information of the interaction object corresponding to the specific interaction behavior of the terminal 800 within the preset time falls within preset ranking, or a range in which ranking of a quantity of occurrence times of the specific attribute information of the interaction object corresponding to the specific interaction behavior of the terminal 800 within the preset time falls within a preset percentage. For example, the first-type authentication information may be a name of a contact whose quantity of talk times within three days exceeds five times, or a name of an ebook whose quantity of ebook reading times within two days exceeds 10% of a total quantity of reading times within two days, or a music album whose playing ranking within five days is on the top three, or a website whose website access frequency within 12 hours is in the first 5%, or the like.

It should be understood that both the preset time and the preset range are configurable. For example, the preset time may be configured as 12 hours, one day, two days, three days, or even one month, or the like, which is not limited in this embodiment of the present invention. For another example, the preset range may be configured as more than one time, more than five times, or first five or first 5% of all occurrence frequencies, or the like.

Optionally, the first-type authentication information further includes specific attribute information of an interaction object specified in the terminal 800 by the user of the terminal 800, so as to reduce a memory price of memorizing the first-type authentication information by the user of the terminal 800.

The foregoing method that is disclosed in any embodiment of FIG. 1 to FIG. 6 of the present invention and is executed by an authentication apparatus may be applied to the processor 802 or implemented by the processor 802. The processor 802 may be an integrated circuit chip and has a signal processing capability. In an implementation process, the steps in the foregoing method may be completed using an integrated logic circuit of hardware in the processor 802 or an instruction in a form of software. The foregoing processor 802 may be a general purpose processor, including a central processing unit (CPU), a network processor (NP), and the like; and may be a digital signal processor (DSP), an application-specific integrated circuit (ASIC), a field programmable gate array (FPGA) or another programmable logic component, a discrete gate or a transistor logic component, or a discrete hardware assembly, which can implement or execute the methods, steps, and logical block diagrams disclosed in the embodiments of the present invention. The general purpose processor may be a microprocessor, or the processor may also be any conventional processor, or the like. The steps of the method disclosed with reference to the embodiments of the present invention may be directly performed and completed using a hardware decoding processor, or performed and completed by combining hardware and software modules in a decoding processor. The software module may be located in a storage medium mature in the art, such as a RAM, a flash memory, a read-only memory (ROM), a programmable ROM, an electrically erasable programmable memory, or a register. The storage medium is located in the memory 803. The processor 802 reads information in the memory 803, and completes the steps of the foregoing method in combination with hardware of the memory 803.

In this embodiment of the present invention, the terminal 800 dynamically generates authentication information using information about an interaction object that is in the terminal and whose occurrence frequency within a preset time is preset, to perform authentication on a user. Because information about a recently most frequently used specific interaction object belongs to information within a memory period of the user, a memory price of the user can be reduced, and authentication information that appears each time is not fixed, which can avoid the authentication information from being stolen due to a peep, resulted from incaution, at the authentication information. Therefore, the terminal 800 reduces the memory price of memorizing the authentication information by the user, and also has a certain anti-peeping capability at the same time.

In addition, because the terminal 800 can dynamically generate the authentication information based on an access frequency, to perform authentication on the user, using experience of the user can further be improved.

Optionally, before the processor 802 receives, using the communications interface 801 and from the input device 806, the identification result obtained by identifying, by the user of the terminal 800, the first-type authentication information and the second-type authentication information that are in the first authentication challenge set, if the interaction object corresponding to the specific interaction behavior of the terminal 800 changes, or the terminal 800 generates a new specific interaction behavior, the processor 802 is further configured to redetermine the first-type authentication information and the second-type authentication information that are of the terminal 800, so that a second authentication challenge set is presented on the display device 805 to the user of the terminal 800 using the communications interface 801, where the second authentication challenge set is generated based on the first-type authentication information and the second-type authentication information that are redetermined by the processor 802. In a specific application, that the interaction object corresponding to the specific interaction behavior of the terminal 800 changes may include: the interaction object corresponding to the specific interaction behavior of the terminal 800 is added, or the interaction object corresponding to the specific interaction behavior of the terminal 800 is deleted, or the interaction object corresponding to the specific interaction behavior of the terminal 800 is modified, or the like.

Optionally, the processor 802 is further configured to configure the preset time, the preset range, and a quantity N of pieces of the first-type authentication information that needs to be identified for performing authentication on the user of the terminal 800. In this case, in a process of determining the authentication result according to the identification correctness rate of the first-type authentication information in the identification result, the processor 802 may be specifically configured to determine, when the quantity of pieces of the first-type authentication information that is identified by the user of the terminal 800 and is in the identification result is not less than N, that the authentication on the user of the terminal 800 succeeds; or determine, when the quantity of pieces of the first-type authentication information that is identified by the user of the terminal 800 and is in the identification result is less than N, that the authentication on the user of the terminal 800 fails.

The processer 802 may adjust security strength of the authentication on the user of the terminal 800 by configuring the preset time, the preset range, and the quantity of pieces of the first-type authentication information that needs to be identified for performing authentication on the user of the terminal 800. If the preset time is longer and the preset range is larger, a set of the first-type authentication information is larger, and the security strength of the authentication on the user of the terminal 800 is higher; if the quantity N of pieces of the first-type authentication information that needs to be identified for performing authentication on the user of the terminal 800 is larger, the identification correctness rate of the first-type authentication information that is in the identification result and is required so that the authentication on the user of the terminal 800 succeeds is larger, and the security strength of the authentication on the user of the terminal 800 is higher.

Optionally, the processor 802 may be further configured to configure a set of excluded authentication information of the terminal 800, where authentication information in the set of excluded authentication information cannot be used as the first-type authentication information. In a process of determining the first-type authentication information of the terminal 800, the processor 802 is specifically configured to determine that specific attribute information that is in the specific attribute information of the interaction object corresponding to the specific interaction behavior of the terminal 800, whose occurrence frequency within the preset time falls in the preset range, and that does not belong to the set of excluded authentication information is the first-type authentication information.

Optionally, the processor 802 may be further configured to generate the authentication set according to information about the first-type authentication information and the second-type authentication information that are of the terminal 800.

In addition, the terminal 800 may further perform the method in FIG. 1 and implement a function, in the embodiments shown in FIG. 1 to FIG. 6, of the authentication apparatus. Reference may be made to the embodiments shown in FIG. 1 to FIG. 6. Details are not described herein in the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes above the scope of the present invention.

It may be clearly understood by a person skilled in the art that, of the purpose of convenient and brief description, of a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A user authentication method, comprising:
   determining first-type authentication information and second-type authentication information that are of a terminal, wherein the first-type authentication information comprises specific attribute information of an interaction object, wherein the interaction object is accessed by the terminal, and wherein an occurrence frequency of the access within a preset time falls in a preset range, wherein the specific attribute information is at least one type of attribute information of the interaction object, and wherein the second-type authentication information is used to interfere with selection, by a user of the terminal, of the first-type authentication information;
   presenting a first authentication challenge set to the user of the terminal, wherein the first authentication challenge set comprises at least one piece of the first-type authentication information and at least one piece of the second-type authentication information;
   receiving an identification result obtained by identifying, by the user of the terminal, the first-type authentication information and the second-type authentication information that are in the first authentication challenge set; and
   determining an authentication result according to an identification correctness rate of the first-type authentication information in the identification result.

2. The method according to claim 1, wherein the second-type authentication information comprises at least one of:
   specific attribute information of the interaction object, wherein the interaction object is accessed by the terminal, and wherein an occurrence frequency of the access within the preset time falls outside the preset range; and
   specific attribute information that does not belong to the specific attribute information of the interaction object.

3. The method according to claim 1, wherein the first-type authentication information further comprises specific attribute information of an interaction object specified in the terminal by the user of the terminal, so as to reduce a memory price of memorizing the first-type authentication information by the user of the terminal.

4. The method according to claim 1, wherein, before the receiving of the identification result obtained by identifying, by the user of the terminal, the first-type authentication information and the second-type authentication information that are in the first authentication challenge set, the method further comprises redetermining the first-type authentication information and the second-type authentication information that are of the terminal, and presenting a second authentication challenge set to the user of the terminal, wherein the second authentication challenge set is generated based on the redetermined first-type authentication information and second-type authentication information, and wherein the redetermining occurs when the interaction object changes, or the terminal generates a new access.

5. The method according to claim 4, wherein the interaction object changing comprises: the interaction object being added, the interaction object being deleted, or the interaction object being modified.

6. The method according to claim 1, wherein the access comprises at least one of:
   a behavior that the terminal accesses a contact in the terminal, wherein the first-type authentication information and the second-type authentication information are specific attribute information of the contact;
   a behavior that the terminal accesses an audio and video file in the terminal, wherein the first-type authentication information and the second-type authentication information are specific attribute information of the audio and video file;
   a behavior that the terminal accesses an application in the terminal, wherein the first-type authentication information and the second-type authentication information are specific attribute information of the application;

a behavior that the terminal accesses a website, wherein the first-type authentication information and the second-type authentication information are specific attribute information of the website;

a behavior that the terminal accesses a picture in the terminal, wherein the first-type authentication information and the second-type authentication information are specific attribute information of the picture;

a behavior that the terminal accesses an ebook in the terminal, wherein the first-type authentication information and the second-type authentication information are specific attribute information of the ebook; and a behavior that the terminal communicates with a device outside the terminal, wherein the first-type authentication information and the second-type authentication information are information about a geographical area in which the terminal is located when the terminal communicates with the device outside the terminal.

7. The method according to claim 1, wherein, before the determining of first-type authentication information and second-type authentication information that are of the terminal, the method further comprises configuring the preset time, the preset range, and a quantity N of pieces of the first-type authentication information that needs to be identified for performing authentication on the user of the terminal, and wherein determining the authentication result according to the identification correctness rate of the first-type authentication information in the identification result comprises at least one of:

determining, when the quantity of pieces of the first-type authentication information that is identified by the user of the terminal and is in the identification result is not less than N, that the authentication on the user of the terminal succeeds; and determining, when the quantity of pieces of the first-type authentication information that is identified by the user of the terminal and is in the identification result is less than N, that the authentication on the user of the terminal fails.

8. The method according to claim 7, wherein, when the preset time is longer and the preset range is larger, a set of the first-type authentication information is larger, and security strength of the authentication on the user of the terminal is higher; and when the quantity N of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

9. The method according to claim 1, wherein the preset range is at least one of:

a range in which a quantity of occurrence times of the specific attribute information of the interaction object within the preset time exceeds a preset quantity of times;

a range in which a quantity of occurrence times of the specific attribute information of the interaction object within the preset time exceeds a preset percentage of a total quantity of occurrence times;

a range in which ranking of a quantity of occurrence times of the specific attribute information of the interaction object within the preset time falls within preset ranking; and a range in which ranking of a quantity of occurrence times of the specific attribute information of the interaction object within the preset time falls within a preset percentage.

10. The method according to claim 1, wherein, before the determining of first-type authentication information of the terminal, the method further comprises configuring a set of excluded authentication information of the terminal, wherein authentication information in the set of excluded authentication information cannot be used as the first-type authentication information, and wherein determining first-type authentication information of the terminal comprises determining that specific attribute information that is in the specific attribute information of the interaction object, whose occurrence frequency within the preset time falls in the preset range, and that does not belong to the set of excluded authentication information, is the first-type authentication information.

11. The method according to claim 1, wherein, before the presenting of the first authentication challenge set to the user of the terminal, the method further comprises generating the first authentication challenge set according to the first-type authentication information and the second-type authentication information that are of the terminal and presenting the first authentication challenge set to the user of the terminal.

12. The method according to claim 1, wherein the terminal comprises a smartphone, a tablet computer, a personal computer, a server, or a workstation.

13. A terminal, comprising:
an input device;
a memory;
a communications interface;
a display device; and
a processor connected to the memory and connected to, using the communications interface, the display device and the input device, wherein the memory stores a group of program code, and wherein the processor is configured to invoke the program code stored in the memory and perform the following operations:
determining first-type authentication information and second-type authentication information that are of the terminal, and presenting a first authentication challenge set on the display device to a user of the terminal using the communications interface, wherein the first-type authentication information comprises specific attribute information of an interaction object, wherein the interaction object is accessed by the terminal, and wherein an occurrence frequency of the access within a preset time falls in a preset range, wherein the specific attribute information is at least one type of attribute information of the interaction object, wherein the second-type authentication information is used to interfere with selection, by the user of the terminal, of the first-type authentication information, and wherein the first authentication challenge set comprises at least one piece of the first-type authentication information and at least one piece of the second-type authentication information; and
receiving, using the communications interface and from the input device, an identification result obtained by identifying, by the user of the terminal, the first-type authentication information and the second-type authentication information that are in the first authentication challenge set, and determining an authentication result according to an identification correctness rate of the first-type authentication information in the identification result, wherein the display device is configured to present the first authentication challenge set to the user of the terminal, and wherein the input device is configured to input the identification result obtained by identifying, by the user of the terminal, the first-type authentication information and the second-type authentication information that are in the first authentication challenge set.

14. The terminal according to claim 13, wherein the second-type authentication information comprises at least one of:
   specific attribute information of the interaction object, wherein the interaction object is accessed by the terminal, and wherein an occurrence frequency of the access within the preset time falls outside the preset range; and
   specific attribute information that does not belong to the specific attribute information of the interaction object.

15. The terminal according to claim 13, wherein the first-type authentication information further comprises specific attribute information of an interaction object specified in the terminal by the user of the terminal, so as to reduce a memory price of memorizing the first-type authentication information by the user of the terminal.

16. The terminal according to claim 13, wherein before the processor receives, using the communications interface and from the input device, the identification result obtained by identifying, by the user of the terminal, the first-type authentication information and the second-type authentication information that are in the first authentication challenge set, and responsive to at least one of the interaction object changing and the terminal generating a new access, the processor is further configured to redetermine the first-type authentication information and the second-type authentication information that are of the terminal, such that a second authentication challenge set is presented on the display device to the user of the terminal using the communications interface, and wherein the second authentication challenge set is generated based on the first-type authentication information and the second-type authentication information that are redetermined by a determining unit.

17. The terminal according to claim 16, wherein the interaction object changing comprises: the interaction object being added, or the interaction object being deleted, or the interaction object being modified.

18. The terminal according to claim 13, wherein the access comprises at least one of:
   a behavior that the terminal accesses a contact in the terminal, wherein the first-type authentication information and the second-type authentication information are specific attribute information of the contact;
   a behavior that the terminal accesses an audio and video file in the terminal, wherein the first-type authentication information and the second-type authentication information are specific attribute information of the audio and video file;
   a behavior that the terminal accesses an application in the terminal, wherein the first-type authentication information and the second-type authentication information are specific attribute information of the application;
   a behavior that the terminal accesses a website, wherein the first-type authentication information and the second-type authentication information are specific attribute information of the website;
   a behavior that the terminal accesses a picture in the terminal, wherein the first-type authentication information and the second-type authentication information are specific attribute information of the picture;
   a behavior that the terminal accesses an ebook in the terminal, wherein the first-type authentication information and the second-type authentication information are specific attribute information of the ebook; and
   a behavior that the terminal communicates with a device outside the terminal, wherein the first-type authentication information and the second-type authentication information are information about a geographical area in which the terminal is located when the terminal communicates with the device outside the terminal.

19. The terminal according to claim 13, wherein the processor is further configured to configure the preset time, the preset range, and a quantity N of pieces of the first-type authentication information that needs to be identified for performing authentication on the user of the terminal, and wherein, in a process of determining the authentication result according to the identification correctness rate of the first-type authentication information in the identification result, the processor is configured to at least one of:
   determine, when the quantity of pieces of the first-type authentication information that is identified by the user of the terminal and is in the identification result is not less than N, that the authentication on the user of the terminal succeeds; and
   determine, when the quantity of pieces of the first-type authentication information that is identified by the user of the terminal and is in the identification result is less than N, that the authentication on the user of the terminal fails.

20. The terminal according to claim 19, wherein, when the preset time is longer and the preset range is larger, a set of the first-type authentication information is larger, and security strength of the authentication on the user of the terminal is higher; and when the quantity N of pieces of the first-type authentication information that needs to be identified for performing authentication on the user of the terminal is larger, the identification correctness rate of the first-type authentication information that is in the identification result and is required so that the authentication on the user of the terminal succeeds is larger, and the security strength of the authentication on the user of the terminal is higher.

21. The terminal according to claim 13, wherein the preset range is at least one of:
   a range in which a quantity of occurrence times of the specific attribute information of the interaction object within the preset time exceeds a preset quantity of times;
   a range in which a quantity of occurrence times of the specific attribute information of the interaction object within the preset time exceeds a preset percentage of a total quantity of occurrence times;
   a range in which ranking of a quantity of occurrence times of the specific attribute information of the interaction object within the preset time falls within preset ranking; and
   a range in which ranking of a quantity of occurrence times of the specific attribute information of the interaction object within the preset time falls within a preset percentage.

22. The terminal according to claim 13, wherein the processor is further configured to configure a set of excluded authentication information of the terminal, wherein authentication information in the set of excluded authentication information cannot be used as the first-type authentication information, and wherein, in a process of determining the first-type authentication information of the terminal, the processor is configured to determine that specific attribute information that is in the specific attribute information of the interaction object, whose occurrence frequency within the preset time falls in the preset range, and that does not belong to the set of excluded authentication information, is the first-type authentication information.

23. The terminal according to claim 13, wherein the processor is further configured to generate the first authentication challenge set according to the first-type authentication information and the second-type authentication information that are of the terminal and to present the first authentication challenge set to the user of the terminal.

24. The terminal according to claim 13, wherein the terminal comprises a smartphone, a tablet computer, a personal computer, a server, or a workstation.

25. The terminal according to claim 13, wherein the display device and the input device are a same device that is in the terminal and has both a display function and an input function or different devices in the terminal.

* * * * *